(12) United States Patent
Ahn et al.

(10) Patent No.: US 10,243,239 B1
(45) Date of Patent: Mar. 26, 2019

(54) GEL POLYMER ELECTROLYTE AND LITHIUM SECONDARY BATTERY COMPRISING THE SAME

(71) Applicant: LG Chem, Ltd., Seoul (KR)

(72) Inventors: Kyoung Ho Ahn, Daejeon (KR); Jeong Woo Oh, Daejeon (KR); Chul Haeng Lee, Daejeon (KR); Yi Jin Jung, Daejeon (KR); Sol Ji Park, Daejeon (KR)

(73) Assignee: LG Chem, Ltd. (KR)

( * ) Notice: Subject to any disclaimer, the term of this patent is extended or adjusted under 35 U.S.C. 154(b) by 162 days.

(21) Appl. No.: 15/515,547

(22) PCT Filed: Oct. 2, 2015

(86) PCT No.: PCT/KR2015/010472
§ 371 (c)(1),
(2) Date: Sep. 18, 2017

(87) PCT Pub. No.: WO2016/053064
PCT Pub. Date: Apr. 7, 2016

(30) Foreign Application Priority Data

Oct. 2, 2014 (KR) ......................... 10-2014-0133433
Oct. 2, 2015 (KR) ......................... 10-2015-0139401

(51) Int. Cl.
*H01M 10/0569* (2010.01)
*H01M 10/052* (2010.01)
*H01M 10/0565* (2010.01)

(52) U.S. Cl.
CPC ..... *H01M 10/0569* (2013.01); *H01M 10/052* (2013.01); *H01M 10/0565* (2013.01); *H01M 2300/0028* (2013.01); *H01M 2300/0082* (2013.01)

(58) Field of Classification Search
None
See application file for complete search history.

(56) References Cited

U.S. PATENT DOCUMENTS

| | | |
|---|---|---|
| 2003/0059681 A1 | 3/2003 | Noh |
| 2005/0271948 A1 | 12/2005 | Kang et al. |
| 2007/0166621 A1 | 7/2007 | Choi et al. |
| 2008/0171267 A1 | 7/2008 | Kang et al. |
| 2009/0317723 A1 | 12/2009 | Yu et al. |
| 2010/0072643 A1 | 3/2010 | Pugh et al. |
| 2010/0119950 A1 | 5/2010 | Hwang et al. |
| 2010/0330433 A1 | 12/2010 | Amine et al. |
| 2012/0015255 A1 | 1/2012 | Hwang et al. |
| 2013/0040207 A1 | 2/2013 | Gupta et al. |
| 2013/0136998 A1 | 5/2013 | Hwang et al. |
| 2013/0295466 A1 | 11/2013 | Kwon et al. |
| 2016/0028090 A1 | 1/2016 | Yoneda et al. |
| 2016/0079631 A1 | 3/2016 | Flitsch et al. |

FOREIGN PATENT DOCUMENTS

| | | |
|---|---|---|
| CN | 101003636 A | 7/2007 |
| CN | 103329332 A | 9/2013 |
| CN | 103732656 A | 4/2014 |
| JP | H08295715 A | 11/1996 |
| JP | 2008534493 A | 8/2008 |
| JP | 2010503175 A | 1/2010 |
| JP | 2012502823 A | 2/2012 |
| JP | 2016025061 A | 2/2016 |
| KR | 20010060179 A | 7/2001 |
| KR | 20030015709 A | 2/2003 |
| KR | 100365392 B1 | 3/2003 |
| KR | 20080057604 A | 6/2008 |
| KR | 20120057158 A | 6/2012 |
| KR | 20120090143 A | 8/2012 |
| KR | 20130058403 A | 6/2013 |
| KR | 20140066163 A | 5/2014 |
| WO | 2013011691 A1 | 1/2013 |
| WO | 2013025414 A1 | 2/2013 |

OTHER PUBLICATIONS

Extended European Search Report for Application No. EP15847150 dated Jun. 29, 2017.
International Search Report for Application No. PCT/KR2015/010473 dated Jan. 19, 2016.
Extended European Search Report for Application No. EP15847219 dated Jul. 19, 2017.
International Search Report for Application No. PCT/KR2015/010472 dated Jan. 8, 2016.
Search Report from 1st Office Action for CN2015800535714 dated Sep. 27, 2018.

*Primary Examiner* — Sarah A. Slifka
(74) *Attorney, Agent, or Firm* — Lerner, David, Littenberg, Krumholz & Mentlik, LLP

(57) ABSTRACT

Provided are a gel polymer electrolyte including a polymer network, and an electrolyte solution impregnated in the polymer network, wherein the polymer network is formed by combining a first oligomer, which includes unit A derived from a monomer including at least one copolymerizable acrylate or acrylic acid, unit C including urethane, and unit E including siloxane, in a three-dimensional structure, and a lithium secondary battery including the gel polymer electrolyte.

21 Claims, 1 Drawing Sheet

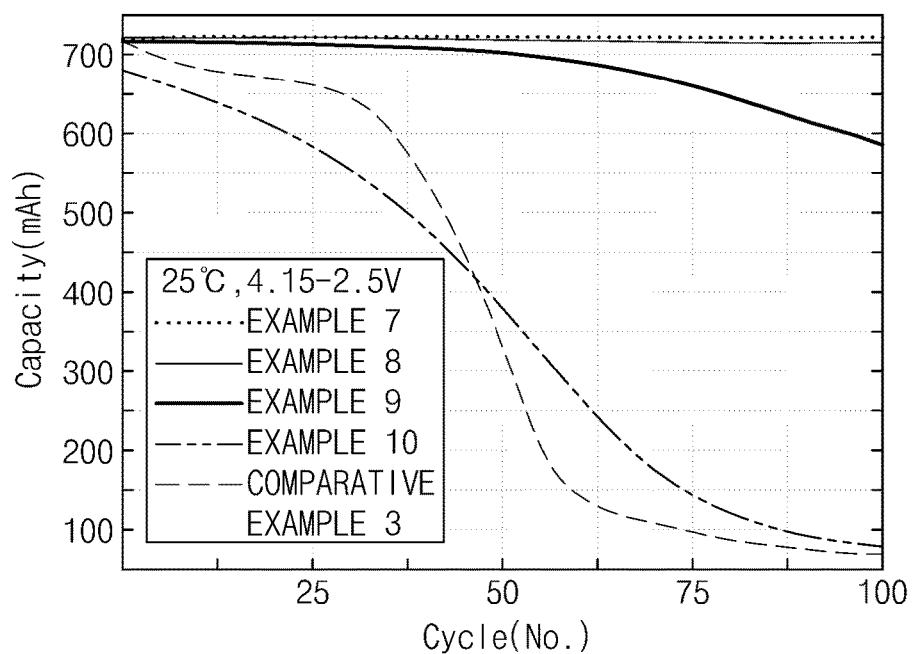

GEL POLYMER ELECTROLYTE AND LITHIUM SECONDARY BATTERY COMPRISING THE SAME

TECHNICAL FIELD

Cross-Reference to Related Applications

The present application is a national phase entry under 35 U.S.C. § 371 of International Application No. PCT/KR2015/010472 filed Oct. 2, 2015 published in Korea, which claims priority from Korean Patent Application Nos. 10-2014-0133433, filed on Oct. 2, 2014, and 10-2015-0139401, filed on Oct. 2, 2015, in the Korean Intellectual Property Office, the disclosures of which are incorporated herein by reference.

TECHNICAL FIELD

The present invention relates to a gel polymer electrolyte and a lithium secondary battery comprising the same.

BACKGROUND ART

Demand for secondary batteries as an energy source has been significantly increased as technology development and demand with respect to mobile devices have increased. Among these secondary batteries, lithium secondary batteries having high energy density and high voltage have been commercialized and widely used.

A lithium metal oxide is used as a positive electrode active material of a lithium secondary battery, and lithium metal, a lithium alloy, crystalline or amorphous carbon, or a carbon composite is used as a negative electrode active material. A current collector may be coated with a positive electrode active material or negative electrode active material of appropriate thickness and length or the active material itself may be coated in the form of a film, and the resultant product is then wound or stacked with an insulating separator to prepare an electrode assembly. Thereafter, the electrode assembly is put into a can or a container similar thereto, and a secondary battery is then prepared by injecting an electrolyte solution.

An electrolyte in a liquid state, particularly, an ion conductive liquid electrolyte, in which a salt is dissolved in a non-aqueous organic solvent, has been mainly used as an electrolyte for an electrochemical device, such as a typical battery using an electrochemical reaction and an electric double-layer capacitor.

However, when the electrolyte in a liquid state is used, an electrode material may degrade and the organic solvent is likely to be volatilized. Also, there may be limitations in safety such as combustion due to increases in ambient temperature and the temperature of the battery itself. In particular, a lithium secondary battery has limitations in that gas may be generated in the battery due to the decomposition of a carbonate organic solvent and/or a side reaction between the organic solvent and an electrode during charge and discharge to expand the thickness of the battery, and such reactions are accelerated during high-temperature storage to further increase an amount of the gas generated.

The continuously generated gas causes an increase in the internal pressure of the battery to not only result in decreased safety, for example, a prismatic type battery is swollen in a specific direction and exploded, or the center of a specific surface of the battery is deformed, but also reduces the performance of the battery by generating local differences in adhesion on the surface of the electrode in the battery to prevent the electrode reaction from occurring across the entire surface of the electrode in the same manner.

As interests in energy storage technologies have been increasingly grown, three is a need to develop a secondary battery capable of being miniaturized and lightweight as well as being charged and discharged with high capacity. Accordingly, development of a battery using a polymer electrolyte formed of a polymer, instead of using a liquid electrolyte, has recently received attention.

In general, it is known that battery safety improves in the order of a liquid electrolyte, a gel polymer electrolyte, and a solid polymer electrolyte, but battery performance decreases in the same order.

That is, the gel polymer electrolyte may have lower lithium ion conductivity than a liquid electrolyte formed only of an electrolyte solution. Thus, a method of decreasing the thickness of the gel polymer electrolyte has been proposed in order to improve the conductivity. However, in this case, there may be limitations in improving the performance and safety of the battery, for example, mechanical strength is decreased and a short-circuit of the polymer electrolyte occurs due to a short-circuit of a positive electrode and a negative electrode during the preparation of the battery.

Therefore, there is a need to develop a gel polymer electrolyte having improved performance and safety of the battery.

PRIOR ART DOCUMENTS

Korean Patent Application Laid-Open Publication No. 10-2013-0058403

DISCLOSURE OF THE INVENTION

Technical Problem

The present invention provides a gel polymer electrolyte including a polymer network which is composed of an oligomer including urethane, acrylate, and siloxane.

The present invention also provides a lithium secondary battery including the gel polymer electrolyte.

Technical Solution

According to an aspect of the present invention, there is provided a gel polymer electrolyte including:

a polymer network; and an electrolyte solution impregnated in the polymer network, wherein the polymer network is formed by combining an oligomer, which includes unit A derived from a monomer including at least one copolymerizable acrylate or acrylic acid, unit C including urethane, and unit E including siloxane, in a three-dimensional structure.

According to another aspect of the present invention, there is provided a composition for a gel polymer electrolyte including:

a lithium salt;

an electrolyte solution solvent;

a polymerization initiator; and an oligomer which includes unit A derived from a monomer including at least one copolymerizable acrylate or acrylic acid, unit C including urethane, and unit E including siloxane.

According to another aspect of the present invention, there is provided a lithium secondary battery including:

a positive electrode and a negative electrode capable of intercalating and deintercalating lithium; and a gel polymer electrolyte disposed between the positive electrode and the negative electrode, wherein the gel polymer electrolyte includes the gel polymer electrolyte of the present invention.

That is, various embodiments of the present invention provide the following gel polymer electrolytes or lithium secondary battery.

(1) a gel polymer electrolyte including: a polymer network; and an electrolyte solution impregnated in the polymer network, wherein the polymer network is formed by combining a first oligomer, which includes unit A derived from a monomer including at least one copolymerizable acrylate or acrylic acid, unit C including urethane, and unit E including siloxane, in a three-dimensional structure.

(2) the gel polymer electrolyte of (1), wherein the first oligomer is represented by Formula 1:

A-[C-E]$_k$-C-A  [Formula 1]

in Formula 1, k is an integer of 1 to 200.

(3) the gel polymer electrolyte of (1), wherein unit A is a unit derived from at least one compound selected from the group consisting of hydroxymethyl(meth)acrylate and hydroxyethyl(meth)acrylate, or a unit represented by Formula (i):

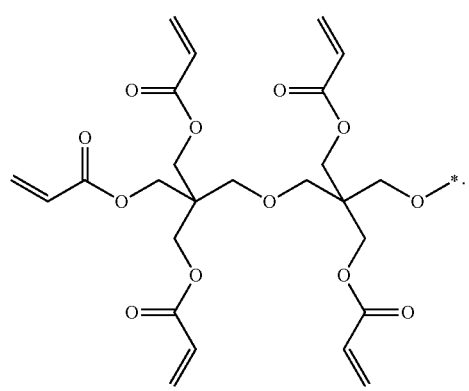

[Formula (i)]

(4) the gel polymer electrolyte of (1), wherein unit C includes a unit represented by Formula 2a or Formula 2b:

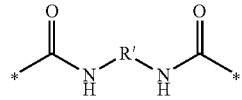

[Formula 2a]

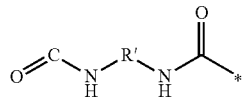

[Formula 2b]

in Formulae 2a and 2b,

R' is at least one selected from the group consisting of a linear or non-linear alkylene group having 1 to 10 carbon atoms, a substituted or unsubstituted cycloalkylene group having 3 to 10 carbon atoms, a substituted or unsubstituted bicycloalkylene group having 6 to 20 carbon atoms, a substituted or unsubstituted arylene group having 6 to 20 carbon atoms, a substituted or unsubstituted biarylene group having 6 to 20 carbon atoms, a naphthalene group, and an anthracene group.

(5) the gel polymer electrolyte of (1), wherein R' includes one compound selected from the group consisting of the following groups:

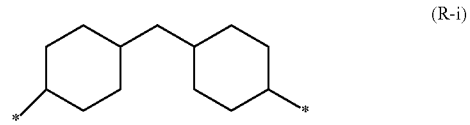

(R-i)

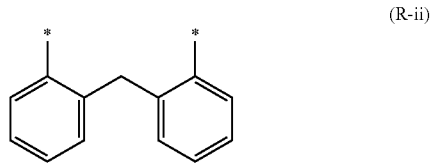

(R-ii)

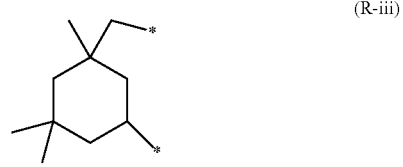

(R-iii)

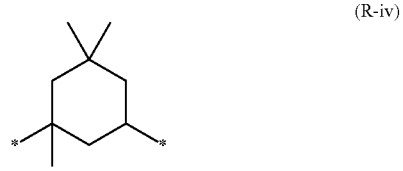

(R-iv)

(R-v)

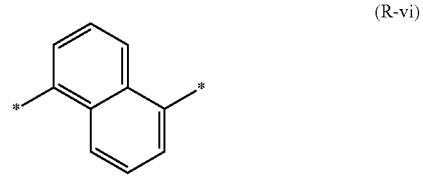

(R-vi)

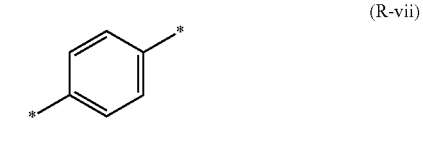

(R-vii)

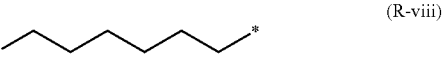

(R-viii)

(6) the gel polymer electrolyte of (1), wherein unit E includes a unit represented by Formula 3:

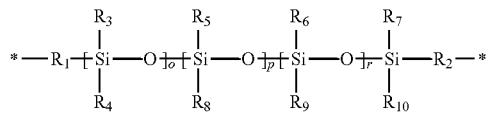

[Formula 3]

in Formula 3, $R_1$ and $R_2$ are a linear or non-linear alkylene group having 1 to 5 carbon atoms, $R_3$ and $R_4$ are each independently one selected from the group consisting of hydrogen, an alkyl group having 1 to 5 carbon atoms, and a phenyl group, $R_5$ to $R_{10}$ are each independently one selected from the group consisting of hydrogen, an alkyl group having 1 to 5 carbon atoms, a phenyl group, and fluorine, O is an integer of 0 or 1, P is an integer of 0 to 400, r is an integer of 1 to 400, and a molar ratio of p:r is in a range of 0:100 to 80:20.

(7) the gel polymer electrolyte of (1), wherein unit E includes at least one compound selected from the group consisting of Formulae 3a to 3g:

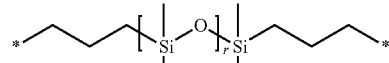

[Formula 3a]

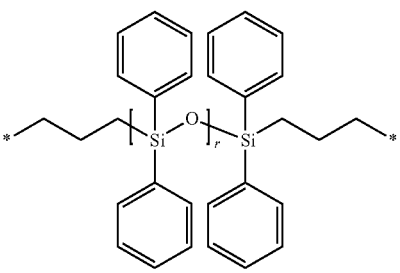

[Formula 3b]

[Formula 3c]

[Formula 3d]

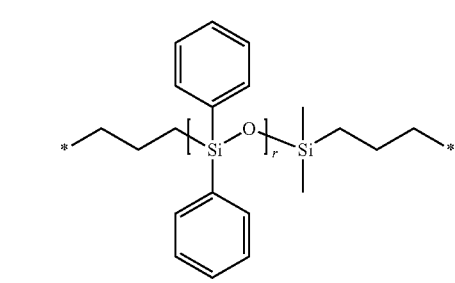

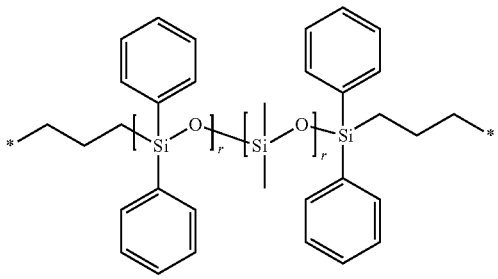

[Formula 3e]

[Formula 3f]

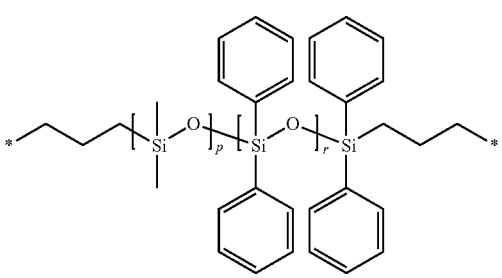

[Formula 3g]

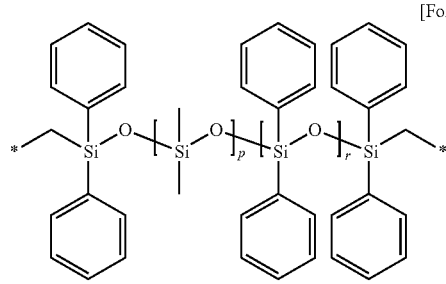

in the above formulae,

P is an integer of 0 to 400, r is an integer of 1 to 400, and a molar ratio of p:r is in a range of 0:100 to 80:20.

(8) the gel polymer electrolyte of (1), wherein an amount of unit A is 1 mol or 2 mols in 1 mol of the first oligomer, and a molar ratio of unit C:unit E is in a range of about 1.005:1 to about 2:1.

(9) the gel polymer electrolyte of (1), wherein the first oligomer selectively further includes at least one unit selected from the group consisting of unit B represented by Formula 4 and unit D represented by Formula 5:

*—CO—R"—O—*      [Formula 4]

*—O—[R'"—O]$_m$—*      [Formula 5]

in Formulae 4 and 5,

R" is a substituted or unsubstituted linear alkylene group having 1 to 10 carbon atoms, or a substituted or unsubstituted non-linear alkylene group having 1 to 10 carbon atoms, R'" is a substituted or unsubstituted linear alkylene group having 1 to 10 carbon atoms, or a substituted or unsubstituted non-linear alkylene group having 1 to 10 carbon atoms, and m is an integer of 1 to 30.

(10) the gel polymer electrolyte of (9), wherein unit B is at least one compound selected from the group consisting of the following groups:

 (B-i)

 (B-ii)

 (B-iii)

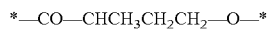 (B-iv).

(11) the gel polymer electrolyte of (9), wherein unit D is at least one compound selected from the group consisting of the following groups:

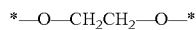 (D-i)

 (D-ii).

(12) the gel polymer electrolyte of (9), wherein the first oligomer is represented by at least one selected from the group consisting of Formulae 6a to 6c:

$[A]_s\text{—}[B]_n\text{—}[C\text{-}E\text{-}]_k\text{-}C\text{—}[B]_n\text{-}A$ [Formula 6a]

$[A]_s\text{—}[C\text{-}D\text{-}E\text{-}D]_k\text{-}C\text{-}A$ [Formula 6b]

$[A]_s\text{—}[B]_n\text{—}[C\text{-}D\text{-}E\text{-}D]_k\text{-}C\text{—}[B]_n\text{-}A$ [Formula 6c]

in the above formulae,
n is an integer of 0 to 30,
k is an integer of 1 to 200, and
s is 0 or 1.

(13) the gel polymer electrolyte of (9), wherein an amount of unit A is 1 mol or 2 mols in 1 mol of the first oligomer, and a molar ratio of unit B:unit C:unit D:unit E is in a range of 0 to 35:2 to 201:0 to 35:1 to 200 (in this case, unit B and unit D are not 0 at the same time).

(14) the gel polymer electrolyte of (9), wherein the first oligomer is at least one compound selected from the group consisting of Formulae 7a to 7d:

[Formula 7a]

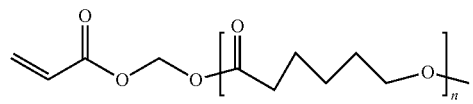

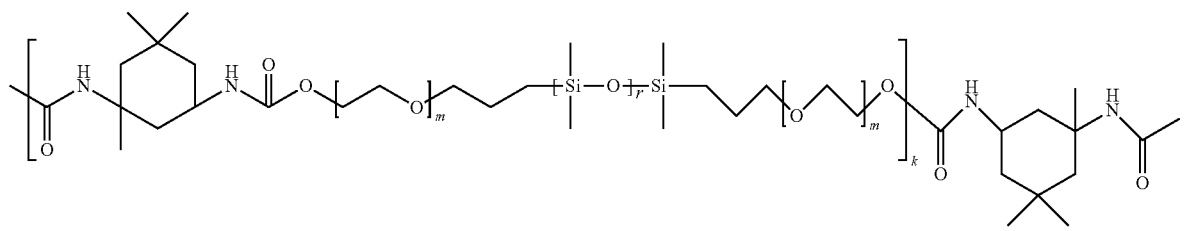

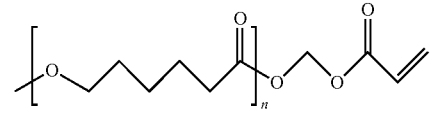

[Formula 7b]

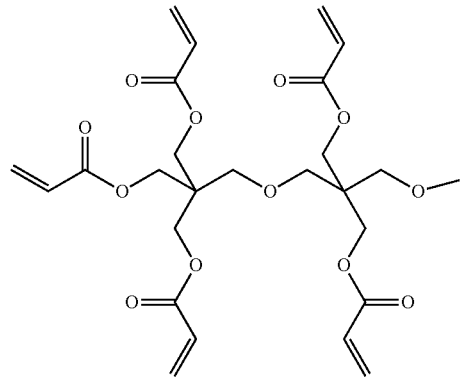

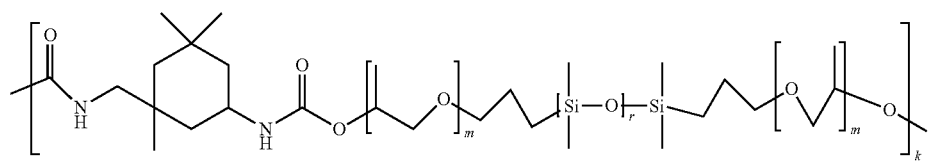

-continued

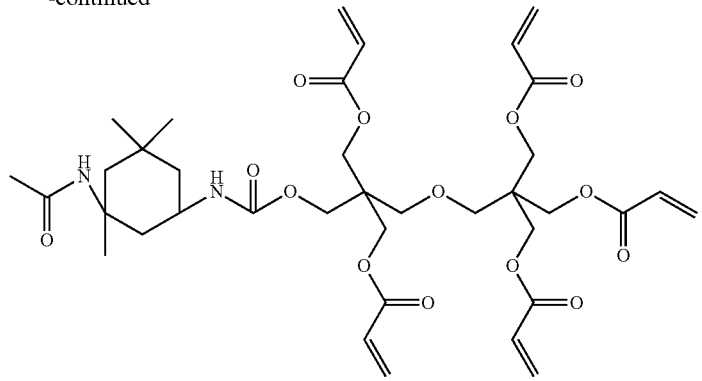

[Formula 7c]

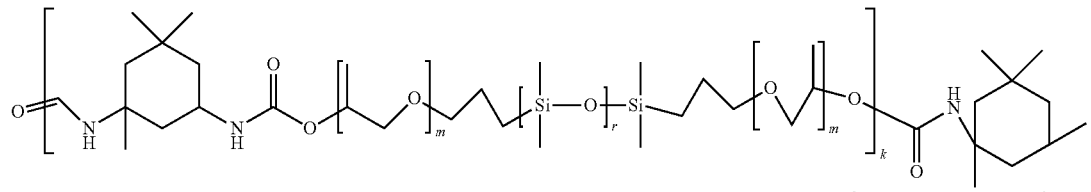

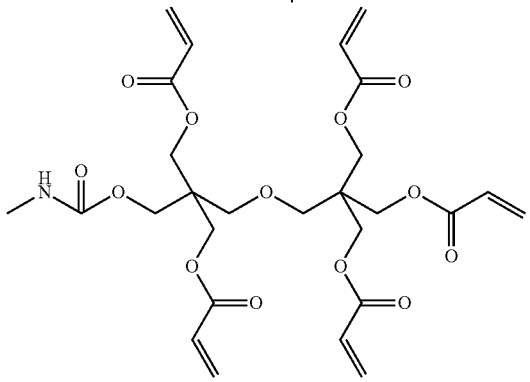

[Formula 7d]

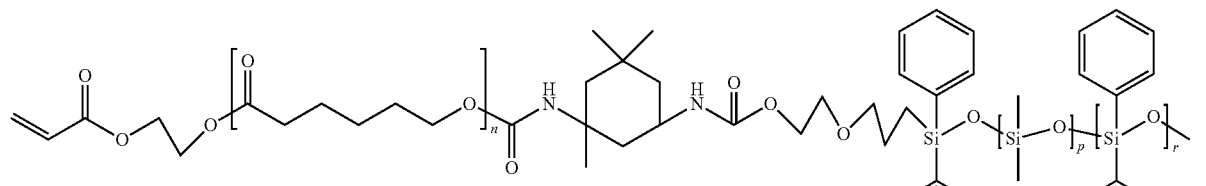

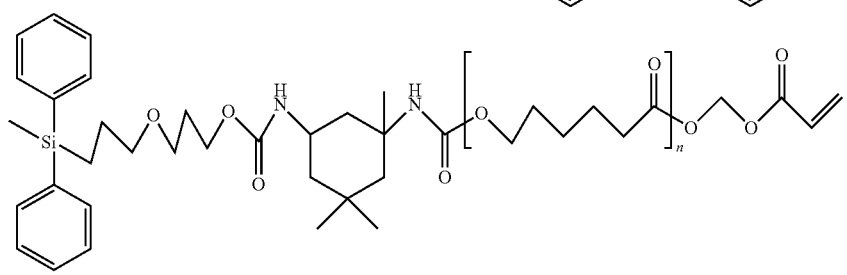

in the above formulae,
k is an integer of 1 to 200,
n is an integer of 1 to 30,
m is an integer of 1 to 30,
P is an integer of 1 to 400,
r is an integer of 1 to 400, and
a molar ratio of p:r is in a range of 0:100 to 80:20.

(15) the gel polymer electrolyte of (1), wherein the gel polymer electrolyte further includes a second oligomer which includes a unit derived from at least one selected from the group consisting of methyl acrylate, methyl methacrylate, ethyl acrylate, ethyl methacrylate, propyl acrylate, propyl methacrylate, butyl acrylate, butyl methacrylate, hexyl acrylate, hexyl methacrylate, ethylhexyl acrylate, ethylhexyl methacrylate, 2,2,2-trifluoroethyl acrylate, 2,2,2-trifluoroethyl methacrylate, 2,2,3,3-tetrafluoropropyl acrylate, and 2,2,3,3-tetrafluoropropyl methacrylate.

(16) the gel polymer electrolyte of (15), wherein the second oligomer is included in an amount of 50 wt % or less based on a total amount of the first oligomer.

(17) the gel polymer electrolyte of (1), wherein the polymer network further contains inorganic particles in the polymer network.

(18) the gel polymer electrolyte of (1), wherein a weight-average molecular weight of the first oligomer is in a range of 1,000 to 100,000.

(19) the gel polymer electrolyte of (1), wherein the gel polymer electrolyte has a Li$^+$ ionic conductivity of $1.0 \times 10^{-4}$ S/cm to $2.0 \times 10^{-2}$ S/cm at a temperature of 25° C. (Celsius).

(20) the gel polymer electrolyte of (1), wherein the gel polymer electrolyte has a Li$^+$ ion transfer coefficient of 0.3 or more at a temperature of 25° C.

(21) the gel polymer electrolyte of (1), wherein the gel polymer electrolyte has a gel content of 1 wt % or more at a temperature of 25° C.

(22) the gel polymer electrolyte of (1), wherein the gel polymer electrolyte has an amount of the unreacted oligomer of 20% or less based on a total input of the reactive oligomer at a temperature of 25° C.

(23) a gel polymer electrolyte including: unit A derived from a monomer including at least one copolymerizable acrylate or acrylic acid; unit C including urethane; and unit E including siloxane.

(24) a gel polymer electrolyte including an oligomer which includes a unit including siloxane, wherein the gel polymer electrolyte has a Li$^+$ ionic conductivity of $1.0 \times 10^{-4}$ S/cm to $2.0 \times 10^{-2}$ S/cm, a Li$^+$ ion transfer coefficient of 0.3 or more, and an amount of the unreacted oligomer of 20% or less based on a total input of the reactive oligomer at a temperature of 25° C.

(25) a composition for a gel polymer electrolyte including: a lithium salt; an electrolyte solution solvent; a polymerization initiator; and a first oligomer which includes unit A derived from a monomer including at least one copolymerizable acrylate or acrylic acid, unit C including urethane, and unit E including siloxane.

(26) the composition for a gel polymer electrolyte of (25), wherein the first oligomer is included in an amount of 0.5 wt % to 20 wt % based on a total weight of the composition for a gel polymer electrolyte.

(27) the composition for a gel polymer electrolyte of (25), wherein the first oligomer is represented by Formula 1:

 [Formula 1]

in Formula 1, k is an integer of 1 to 200.

(28) the composition for a gel polymer electrolyte of (25), wherein unit A is a unit derived from at least one compound selected from the group consisting of hydroxymethyl(meth)acrylate and hydroxyethyl(meth)acrylate, or a unit represented by Formula (i):

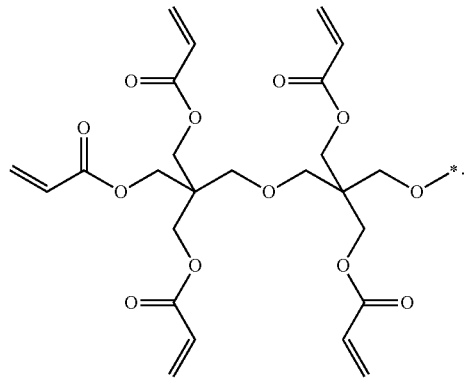

[Formula (i)]

(29) the composition for a gel polymer electrolyte of (25), wherein unit C includes a unit represented by Formula 2a or Formula 2b:

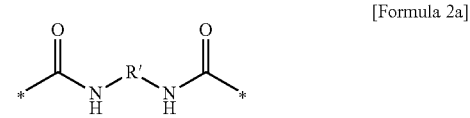

[Formula 2a]

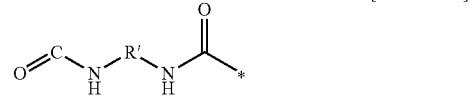

[Formula 2b]

in Formulae 2a and 2b,

R' is at least one selected from the group consisting of a linear or non-linear alkylene group having 1 to 10 carbon atoms, a substituted or unsubstituted cycloalkylene group having 3 to 10 carbon atoms, a substituted or unsubstituted bicycloalkylene group having 6 to 20 carbon atoms, a substituted or unsubstituted arylene group having 6 to 20 carbon atoms, a substituted or unsubstituted biarylene group having 6 to 20 carbon atoms, a naphthalene group, and an anthracene group.

(30) the composition for a gel polymer electrolyte of (25), wherein unit E includes a unit represented by Formula 3:

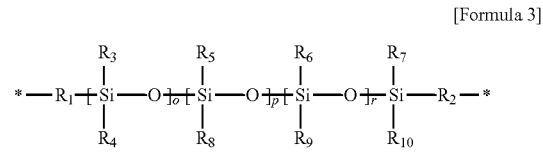

[Formula 3]

in Formula 3, $R_1$ and $R_2$ are a linear or non-linear alkylene group having 1 to 5 carbon atoms, $R_3$ and $R_4$ are each independently one selected from the group consisting of hydrogen, an alkyl group having 1 to 5 carbon atoms, and a phenyl group, $R_5$ to $R_{10}$ are each independently one selected from the group consisting of hydrogen, an alkyl group having 1 to 5 carbon atoms, a phenyl group, and fluorine, O is an integer of 0 or 1, P is an integer of 0 to 400, r is an integer of 1 to 400, and a molar ratio of p:r is in a range of 0:100 to 80:20.

(31) the composition for a gel polymer electrolyte of (25), wherein an amount of unit A is 1 mol or 2 mols in 1 mol of the first oligomer, and a molar ratio of unit C:unit E may be in a range of 1.005:1 to 2:1.

(32) the composition for a gel polymer electrolyte of (25), wherein the first oligomer selectively further includes at least one unit selected from the group consisting of unit B represented by Formula 4 and unit D represented by Formula 5:

  [Formula 4]

  [Formula 5]

in Formulae 4 and 5,

R" is a substituted or unsubstituted linear alkylene group having 1 to 10 carbon atoms, or a substituted or unsubstituted non-linear alkylene group having 1 to 10 carbon atoms, R'" is a substituted or unsubstituted linear alkylene group having 1 to 10 carbon atoms, or a substituted or unsubstituted non-linear alkylene group having 1 to 10 carbon atoms, and m is an integer of 1 to 30.

(33) the composition for a gel polymer electrolyte of (32), wherein the first oligomer is represented by at least one selected from the group consisting of Formulae 6a to 6c:

  [Formula 6a]

  [Formula 6b]

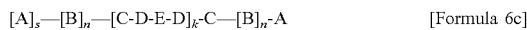  [Formula 6c]

in the above formulae, n is an integer of 0 to 30, k is an integer of 1 to 200, and s is 0 or 1.

(34) the composition for a gel polymer electrolyte of (32), wherein an amount of unit A is 1 mol or 2 mols in 1 mol of the oligomer, and a molar ratio of unit B:unit C:unit D:unit E is in a range of 0 to 35:2 to 201:0 to 35:1 to 200 (in this case, unit B and unit D are not 0 at the same time).

(35) the composition for a gel polymer electrolyte of (32), wherein the first oligomer is at least one compound selected from the group consisting of Formulae 7a to 7d:

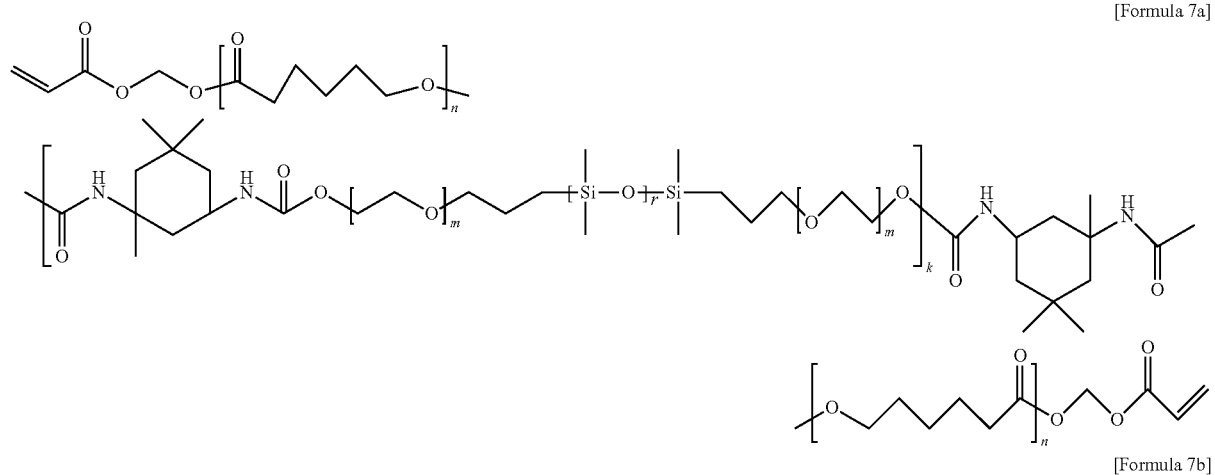

[Formula 7a]

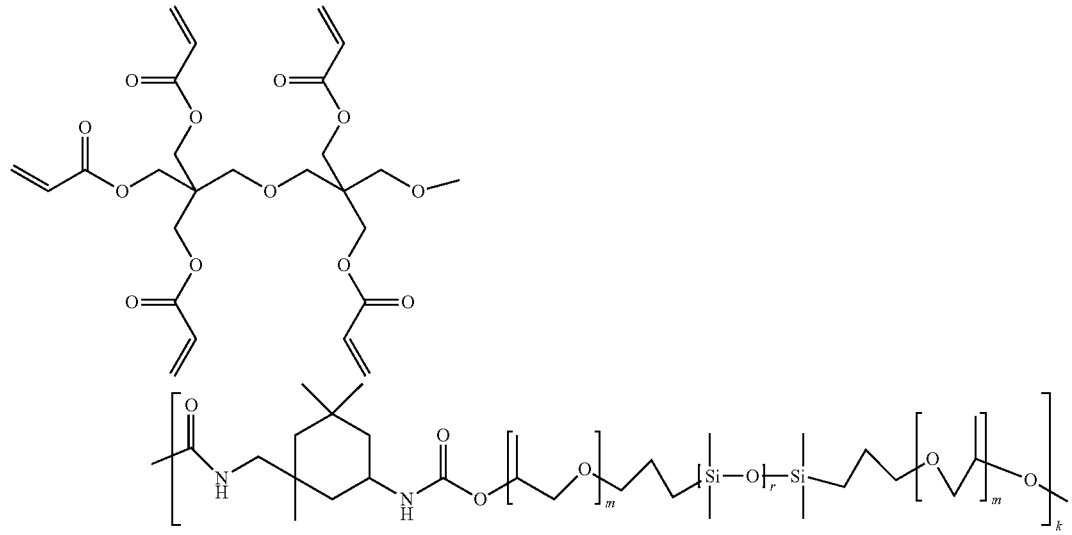

[Formula 7b]

-continued
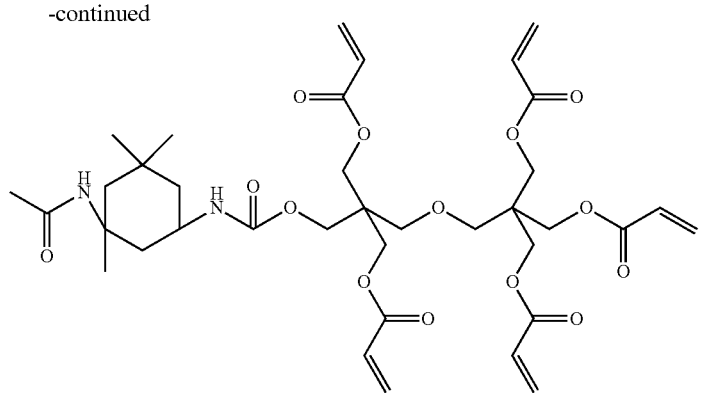
[Formula 7c]
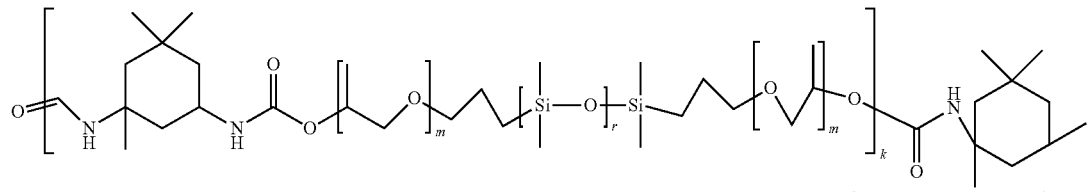
[Formula 7d]
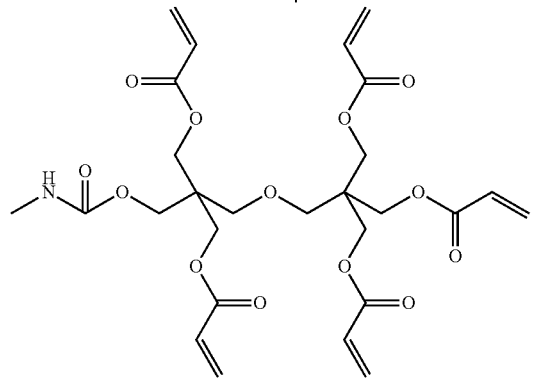
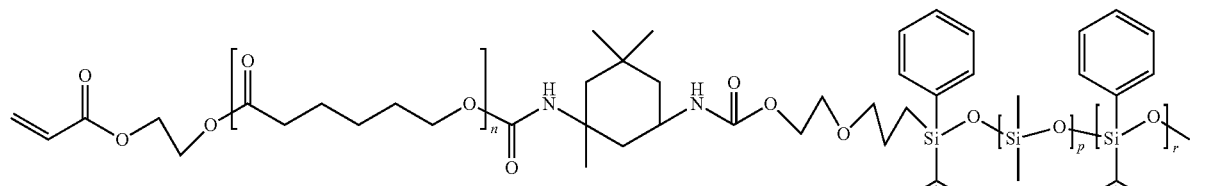
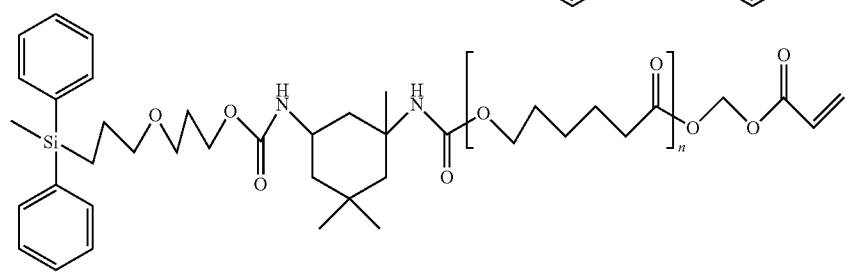
in the above formulae,
k is an integer of 1 to 200,
n is an integer of 1 to 30,
m is an integer of 1 to 30,
P is an integer of 1 to 400,
r is an integer of 1 to 400, and
a molar ratio of p:r is in a range of 0:100 to 80:20.
(36) the composition for a gel polymer electrolyte of (25), wherein the polymer network further contains inorganic particles in the polymer network.

(37) the composition for a gel polymer electrolyte of (25), wherein a weight-average molecular weight of the oligomer is in a range of 1,000 to 100,000.

(38) the composition for a gel polymer electrolyte of (25), wherein the polymerization initiator includes any one selected from the group consisting of benzoyl peroxide, acetyl peroxide, dilauryl peroxide, di-tert-butyl peroxide, t-butyl peroxy-2-ethyl-hexanoate, cumyl hydroperoxide, hydrogen peroxide, 2,2'-azobis(2-cyanobutane), 2,2'-azobis (methylbutyronitrile), 2,2'-azobis(iso-butyronitrile) (AIBN), and 2,2'-azobis(dimethylvaleronitrile) (AMVN), or a mixture of two or more thereof.

(39) the composition for a gel polymer electrolyte of (25), wherein the polymerization initiator is included in an amount of 0.01 wt % to 2 wt % based on a total amount of the oligomer.

(40) the composition for a gel polymer electrolyte of (25), wherein the lithium salt includes one selected from the group consisting of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$, $LiC_4BO_8$, LiTFSI, and LiFSI, or a mixture of two or more thereof.

(41) the composition for a gel polymer electrolyte of (25), wherein the lithium salt is included in an amount of 10 wt % to 50 wt % based on a total amount of the polymerization initiator and oligomer.

(42) the composition for a gel polymer electrolyte of (25), wherein the electrolyte solution solvent includes linear carbonate, cyclic carbonate, or a combination thereof.

(43) the composition for a gel polymer electrolyte of (25), wherein the linear carbonate includes one selected from the group consisting of dimethyl carbonate, diethyl carbonate, dipropyl carbonate, ethylmethyl carbonate, methylpropyl carbonate, and ethylpropyl carbonate, or a mixture of two or more thereof, and the cyclic carbonate includes one selected from the group consisting of ethylene carbonate, propylene carbonate, 1,2-butylene carbonate, 2,3-butylene carbonate, 1,2-pentylene carbonate, 2,3-pentylene carbonate, vinylene carbonate, and a halide thereof, or a mixture of two or more thereof.

(44) a lithium secondary battery including: a positive electrode and a negative electrode capable of intercalating and deintercalating lithium; and a polymer electrolyte disposed between the positive electrode and the negative electrode, wherein the polymer electrolyte includes the gel polymer electrolyte of (1).

(45) the lithium secondary battery of (44), wherein a charge voltage of the lithium secondary battery is in a range of 2.5 V to 5.0 V.

(46) an electrochromic device including: a first electrode; a second electrode; an electrochromic material; and the gel polymer electrolyte of (1).

Advantageous Effects

A gel polymer electrolyte of the present invention may improve mechanical strength as well as ionic conductivity by comprising a polymer network which is composed of an oligomer including urethane, acrylate, and siloxane. Thus, a lithium secondary battery having improved lifetime characteristics and capacity characteristics may be prepared. In addition, the gel polymer electrolyte of the present invention may be used in both aqueous and non-aqueous negative electrode systems.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

FIG. 1 is a graph illustrating the results of charge and discharge test according to Experimental Example 4.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Unless otherwise specified in the present invention, the expression "*" denotes the same or different atom or a portion connected between ends of a formula.

Specifically, according to an embodiment of the present invention, provided is a gel polymer electrolyte including:

a polymer network; and an electrolyte solution impregnated in the polymer network, wherein the polymer network is formed by combining a first oligomer, which includes unit A derived from a monomer including at least one copolymerizable acrylate or acrylic acid, unit C including urethane, and unit E including siloxane, in a three-dimensional structure.

In general, a gel-type polymer electrolyte may not only have poor safety and mechanical properties in comparison to a solid polymer electrolyte, but may also have lower ionic conductivity than a liquid electrolyte. Thus, research into improving the mechanical properties or ionic conductivity by using a copolymer, such as an oligomer, has recently conducted. However, in a case in which a monomer is used alone, cycle characteristics may degrade and a desired level of mechanical properties may not be obtained. In a case in which an oligomer compound is used alone, the adjustment of physical properties may not only be facilitated, but the uniform formation of a polymer in a battery may also be difficult so that it may be difficult to be applied to a recent high-capacity and large battery.

The present invention attempts to address the above limitations at a time by providing a gel polymer electrolyte including a polymer network which is formed by an oligomer compound prepared by polymerizing compounds having physical properties that may complement electrochemical properties and mechanical properties.

In particular, with respect to a typical gel polymer electrolyte including a polar end group such as acrylate, there is no limitations when it is used in a non-aqueous negative electrode system using a non-aqueous binder such as polyvinylidene fluoride (PVDF), but, when it is used in an aqueous negative electrode system using an aqueous binder such as carboxymethyl cellulose (CMC) or a styrene-butadiene rubber (SBR), ionic conductivity may be reduced due to resistance. Thus, in the present invention, since the gel polymer electrolyte including an oligomer, in which a ratio of unit A derived from a monomer including acrylic acid, unit C including urethane, and unit E including siloxane are appropriately adjusted, is provided, the occurrence of a side reaction may be prevented under any circumstances, such as an aqueous negative electrode system as well as a non-aqueous negative electrode system, and the ionic conductivity may be improved by reducing the resistance.

First, the first oligomer included in the gel polymer electrolyte of the present invention may be represented by the following Formula 1.

$$A\text{-}[C\text{-}E]_k\text{-}C\text{-}A \qquad \text{[Formula 1]}$$

In Formula 1, k is an integer of 1 to 200.

Specifically, in the realization of the gel polymer electrolyte of the present invention, unit A constituting the oligomer, as a component for forming a gel polymer through a curing reaction in the oligomer, is a unit derived from a monomer including at least one monofunctional or multifunctional (meth)acrylate or acrylic acid which contains a carbon-oxygen single bond in a molecular structure, wherein unit A may be a compound including 1 to 20, for example, 1 to 10 acrylate or methacrylate structures.

Specifically, typical examples of unit A constituting the oligomer may be a unit derived from at least one compound selected from the group consisting of hydroxymethyl(meth)acrylate and hydroxyethyl(meth)acrylate, or a unit represented by the following Formula (i).

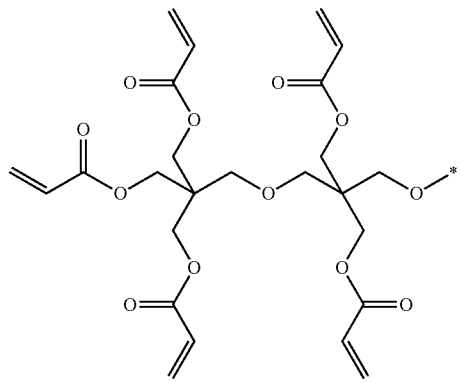

[Formula (i)]

Also, in the realization of the gel polymer electrolyte of the present invention, unit C constituting the oligomer, as a component for providing functions to control ion transport properties and adjust mechanical properties and adhesion, is specifically a unit structure required for forming a rigid structure in the molecule in order to fix anions of a salt and secure the flexibility of a polymer.

Specifically, unit C may be represented by a compound of the following Formula 2a or Formula 2b.

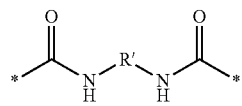

[Formula 2a]

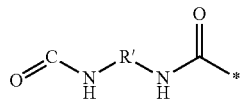

[Formula 2b]

In Formulae 2a and 2b,

R' is at least one selected from the group consisting of a linear or non-linear alkylene group having 1 to 10 carbon atoms, a substituted or unsubstituted cycloalkylene group having 3 to 10 carbon atoms, a substituted or unsubstituted bicycloalkylene group having 6 to 20 carbon atoms, a substituted or unsubstituted arylene group having 6 to 20 carbon atoms, a substituted or unsubstituted biarylene group having 6 to 20 carbon atoms, a naphthalene group, and an anthracene group.

In this case, in the compound of Formula 2a or Formula 2b, R' may include one selected from the group consisting of the following groups.

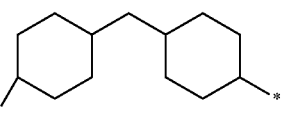

(R-i)

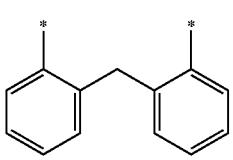

(R-ii)

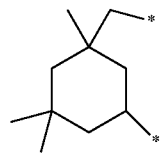

(R-iii)

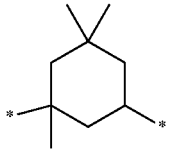

(R-iv)

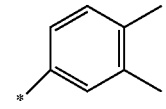

(R-v)

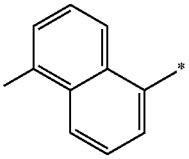

(R-vi)

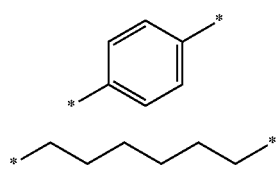

(R-vii)

(R-viii)

Also, in the realization of the gel polymer electrolyte of the present invention, unit E constituting the oligomer, as a component added for controlling mechanical properties and affinity to a separator, may form a structure for securing flexibility in addition to a rigid structure region by an urethane bond in the polymer structure and, simultaneously, may increase affinity to a polyolefin-based separator material by using low polarity. In particular, in a case in which the affinity to the polyolefin-based separator material is improved, since the resistance may be reduced, an effect of further improving the ionic conductivity may be simultaneously obtained.

Unit E may be represented by Formula 3 below.

[Formula 3]

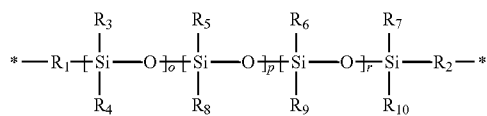

In Formula 3, $R_1$ and $R_2$ are a linear or non-linear alkylene group having 1 to 5 carbon atoms, $R_3$ and $R_4$ are each independently one selected from the group consisting of hydrogen, an alkyl group having 1 to 5 carbon atoms, and a phenyl group, $R_5$ to $R_{10}$ are each independently one selected from the group consisting of hydrogen, an alkyl group having 1 to 5 carbon atoms, a phenyl group, and fluorine, O is an integer of 0 or 1, P is an integer of 0 to 400, r is an integer of 1 to 400, and a molar ratio of p:r is in a range of 0:100 to 80:20.

Specifically, a typical example of unit E may be a compound selected from the group consisting of Formulae 3a to 3g below.

[Formula 3a]

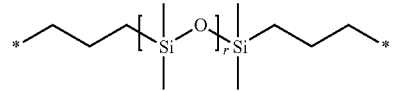

[Formula 3b]

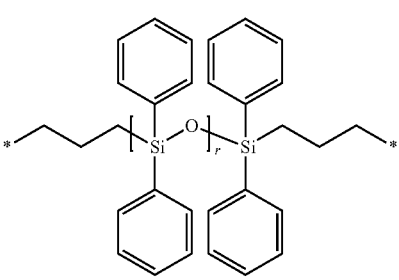

[Formula 3c]

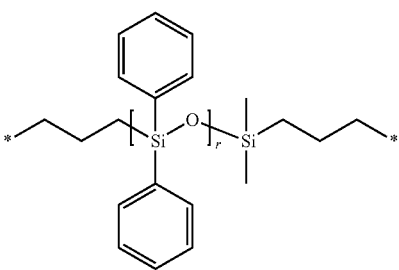

[Formula 3d]

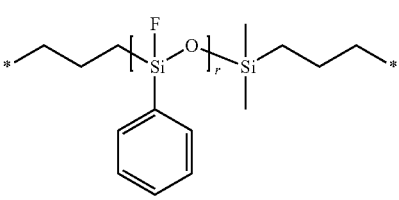

[Formula 3e]

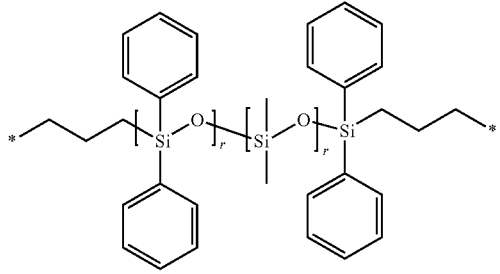

[Formula 3f]

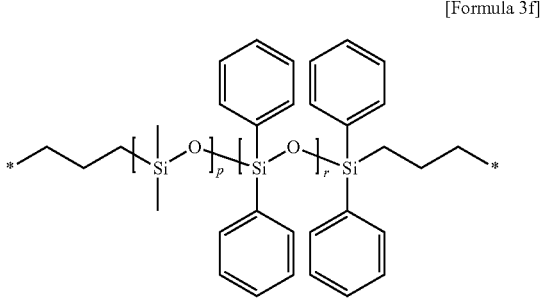

[Formula 3g]

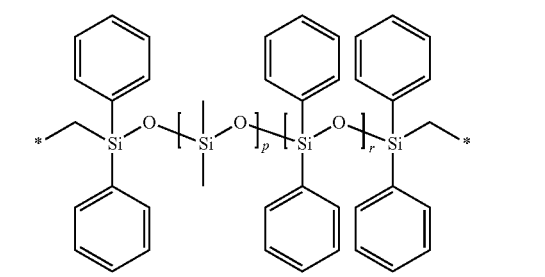

In the above formulae,

P is an integer of 0 to 400, r is an integer of 1 to 400, and a molar ratio of p:r is in a range of 0:100 to 80:20.

Also, in the formation of the gel polymer electrolyte of the present invention, an amount of unit A may be 1 mol or 2 mols in 1 mol of the oligomer, and a molar ratio of unit C:unit E may be in a range of about 1.005:1 to about 2:1. For example, when k is 200, the molar ratio of unit C:unit E may be 201:200, i.e., 1.005:1.

Furthermore, in the realization of the gel polymer electrolyte of the present invention, the oligomer may selectively further include at least one unit selected from the group consisting of unit B represented by the following Formula 4 and unit D represented by the following Formula 5.

$$*-CO-R''-O-* \quad \text{[Formula 4]}$$

$$*-O-[R'''-O]_m-* \quad \text{[Formula 5]}$$

In Formulae 4 and 5,

R'' is a substituted or unsubstituted linear alkylene group having 1 to 10 carbon atoms, or a substituted or unsubstituted non-linear alkylene group having 1 to 10 carbon atoms, R''' is a substituted or unsubstituted linear alkylene group having 1 to 10 carbon atoms, or a substituted or unsubstituted non-linear alkylene group having 1 to 10 carbon atoms, and m is an integer of 1 to 30.

In this case, the gel polymer electrolyte of the present invention may have an effect of increasing dissociation of the salt in the polymer structure and affinity to a surface having high polarity in the battery by further including unit D derived oxyalkylene and unit B in the oligomer structure.

Specifically, unit B is a unit for providing functions to control impregnation capability and ion transfer capability of a solvent, wherein unit B may include at least one selected from the group consisting of the following groups.

*—CO—CH$_2$CH$_2$—O—*  (B-i)

*—CO—CHCH$_3$CH$_2$—O—*  (B-ii)

*—CO—CH$_2$CH$_2$CH$_2$CH$_2$CH$_2$—O—*  (B-iii)

*—CO—CHCH$_3$CH$_2$CH$_2$—O—*  (B-iv)

Also, unit D is a unit for providing functions to control the impregnation capability, electrode affinity, and ion transfer capability of the solvent, wherein unit D may include at least one selected from the group consisting of the following groups.

*—O—CH$_2$CH$_2$—O—*  (D-i)

*—O—CHCH$_3$CH$_2$—O—*  (D-ii)

Furthermore, the oligomer included in the gel polymer electrolyte of the present invention may be represented by at least one selected from the group consisting of Formulae 6a to 6c below.

[A]$_s$—[B]$_n$—[C-E-]$_k$-C—[B]$_n$-A  [Formula 6a]

[A]$_s$—[C-D-E-D]$_k$-C-A  [Formula 6b]

[A]$_s$—[B]$_n$—[C-D-E-D]$_k$-C—[B]$_n$-A  [Formula 6c]

In the above formulae,
n is an integer of 0 to 30,
k is an integer of 1 to 200, and
s is 0 or 1.

An amount of unit A may be 2 mols in 1 mol of the oligomer, and a molar ratio of unit B:unit C:unit D:unit E may be in a range of 0 to 35:2 to 201:0 to 35:1 to 200, particularly, 0 to 35:10 o 100:0 to 35:20 to 100, and, more particularly, 0 to 5:10 to 100:0 to 30:20 to 100 (in this case, unit B and unit D are not 0 at the same time).

Also, in the gel polymer electrolyte of the present invention, a typical example of the oligomer may be at least one selected from the group consisting of Formulae 7a to 7d below.

[Formula 7a]

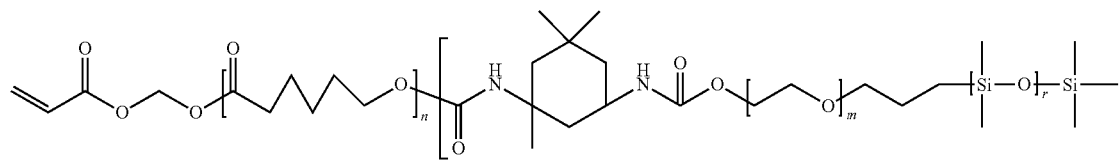

[Formula 7b]

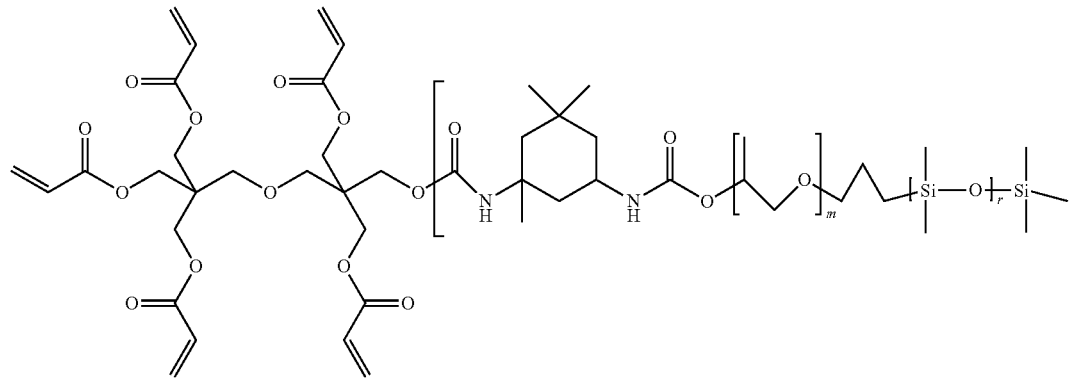

-continued

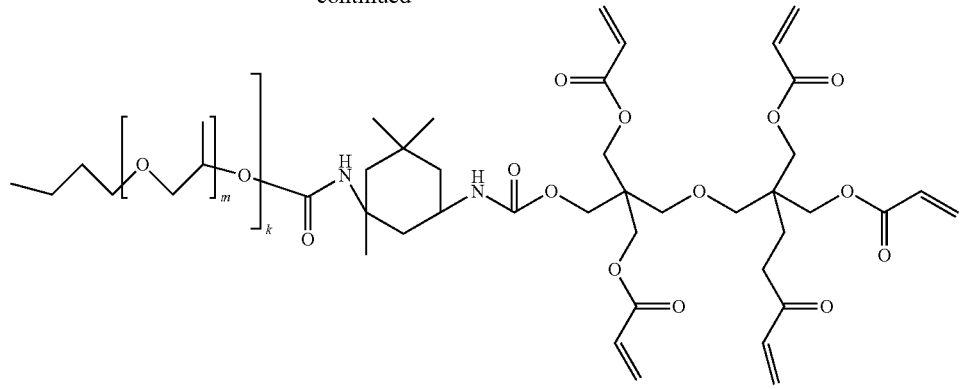

[Formula 7c]

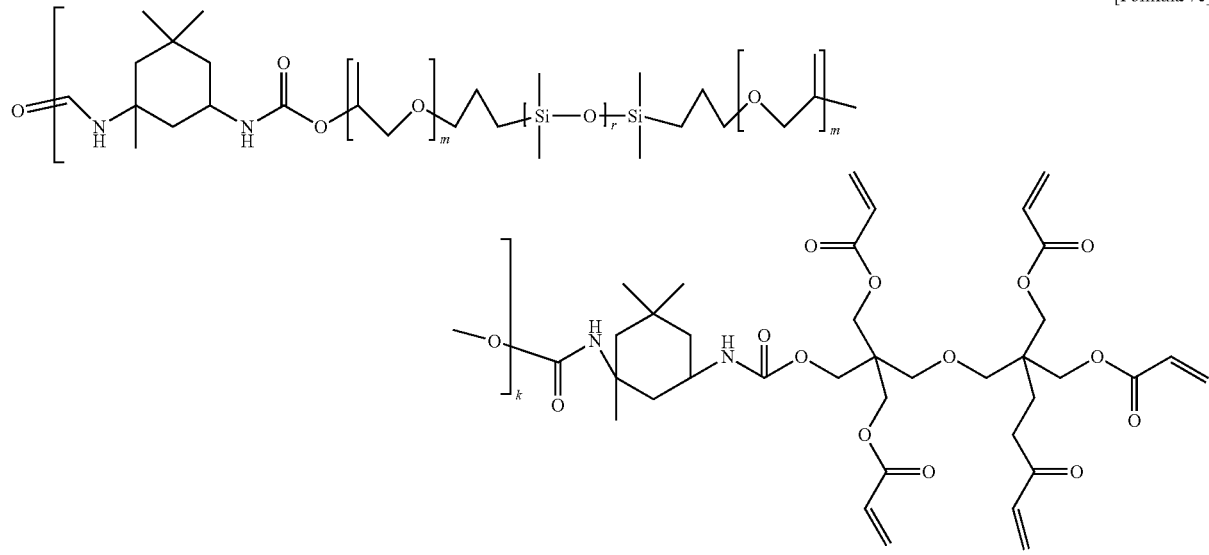

[Formula 7d]

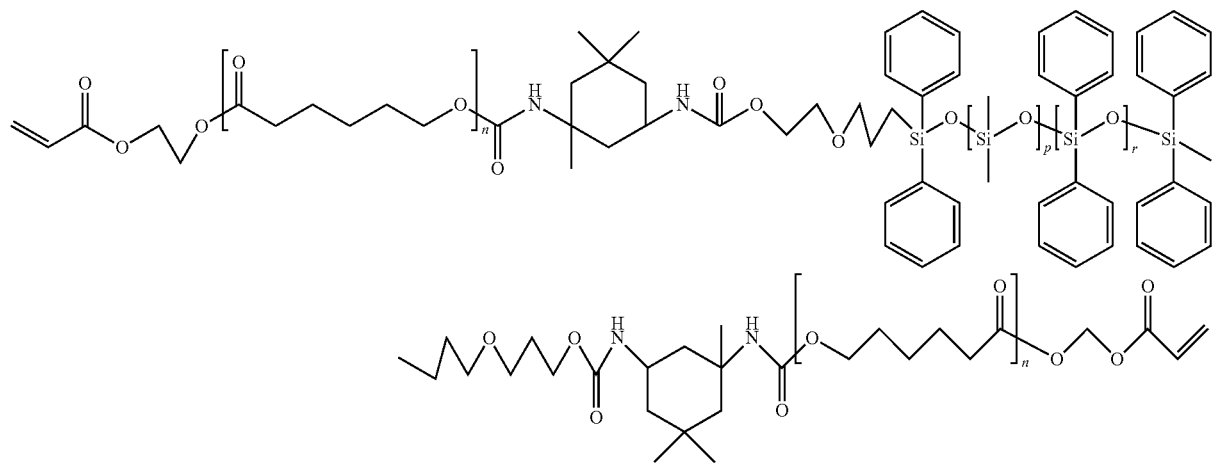

In the above formulae,
k is an integer of 1 to 200,
n is an integer of 1 to 30,
m is an integer of 1 to 30,
P is an integer of 1 to 400,
r is an integer of 1 to 400, and
a molar ratio of p:r is in a range of 0:100 to 80:20.

A weight-average molecular weight of the oligomer for the formation of the gel polymer electrolyte of the present invention may be in a range of about 1,000 to about 100,000. In a case in which the weight-average molecular weight of the oligomer is within the above range, mechanical strength of the battery including the oligomer may be effectively improved.

Also, in order to further improve the mechanical strength and hardening effect, the gel polymer electrolyte may further include a second oligomer including a unit derived from at least one selected from the group consisting of methyl acrylate, methyl methacrylate, ethyl acrylate, ethyl methacrylate, propyl acrylate, propyl methacrylate, butyl acrylate, butyl methacrylate, hexyl acrylate, hexyl methacrylate, ethylhexyl acrylate, ethylhexyl methacrylate, 2,2,2-trifluoroethyl acrylate, 2,2,2-trifluoroethyl methacrylate, 2,2,3,3-tetrafluoropropyl acrylate, and 2,2,3,3-tetrafluoropropyl methacrylate.

In this case, the second oligomer may be included in an amount of 50 wt % or less, for example, 20 wt % or less, based on a total amount of the first oligomer. In a case in which the amount of the second oligomer is greater than 50 wt %, since the oligomer is excessively included to increase the resistance, cycle characteristics may be degraded.

The gel polymer electrolyte of the present invention as described above may not only secure excellent mechanical properties of the gel polymer electrolyte, but may also increase the affinity to the polyolefin-based separator material by including unit E including siloxane in the oligomer structure as described above. In addition, since the affinity to the separator material is improved, the resistance may be reduced to improve the ion transport properties. Thus, an effect of further improving the ionic conductivity may be obtained at the same time.

Also, since the gel polymer electrolyte of the present invention selectively includes units B and D and the urethane bond of unit C in the structure, the gel polymer electrolyte may not only have the effect of further improving the ionic conductivity by further strengthening the ion transport properties, but may also relieve stress due to volume expansion occurred during the operation of the battery by increasing elasticity and flexibility. Furthermore, the gel polymer electrolyte of the present invention may effectively fix the electrolyte solution by securing additional heat resistance through an acrylic functional group of unit A that is configured in the end.

Accordingly, since there is no need to reduce the thickness of the gel polymer electrolyte by improving the ionic conductivity, the gel polymer electrolyte of the present invention may secure sufficient mechanical strength and may also improve lifetime characteristics of the secondary battery including the gel polymer electrolyte.

In particular, since the present invention may provide the gel polymer electrolyte including the oligomer, in which a ratio of unit A derived from a monomer including acrylic acid, unit C including urethane, unit E including siloxane, unit B, and unit D are appropriately adjusted, the present invention may have the effect of improving the ionic conductivity by reducing the resistance even under any circumstances, such as an aqueous negative electrode system as well as a non-aqueous negative electrode system.

In the gel polymer electrolyte of the present invention, the polymer network may further contain inorganic particles in an amount of 10 wt % to 25 wt % based on a total weight of the polymer network.

The inorganic particles are impregnated in the polymer network and thus, may allow a high-viscosity solvent to be well permeated through pores which are formed by spaces between the inorganic particles. That is, since the inorganic particles are included, an effect of further improving wettability to the high-viscosity solvent due to affinity between polar materials and a capillary phenomenon may be obtained.

Inorganic particles, in which the permittivity is high and an oxidation and/or reduction reaction does not occur in an operating voltage range (for example, 0 to 5 V based on Li/Li$^+$) of the lithium secondary battery, may be used as the above inorganic particles.

Specifically, typical examples of the inorganic particles have a dielectric constant of 5 or more, and may be any one selected from the group consisting of $BaTiO_3$, $Pb(Zr,Ti)O_3$ (PZT), $Pb_{1-x}La_xZr_{1-y}Ti_yO_3$(PLZT, where $0<x<1$, $0<y<1$), $Pb(Mg_{1/3}Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC, and a mixture thereof, or a mixture of two or more thereof.

Also, in addition to the above inorganic particles, inorganic particles having lithium ion transfer capability, i.e., lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), (LiAlTiP)$_xO_y$-based glass ($0<x<4$, $0<y<13$) such as $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$) such as $Li_{3.25}Ge_{0.25}P_{0.75}S_4$, lithium nitride ($Li_xN_y$, $0<x<4$, $0<y<2$) such as $Li_3N$, $SiS_2$-based glass ($Li_xSi_yS_z$, $0<x<3$, $0<y<2$, $0<z<4$) such as $Li_3PO_4$—$Li_2S$—$SiS_2$, $P_2S_5$-based glass ($Li_xP_yS_z$, $0<x<3$, $0<y<3$, $0<z<7$) such as LiI—$Li_2S$—$P_2S_5$, or a mixture thereof may be further included.

An average particle diameter of the inorganic particles may be in a range of about 0.001 μm to about 10 μm so as to provide adequate porosity with uniform thickness in the gel polymer electrolyte. In a case in which the average particle diameter is less than 0.001 μm, dispersibility may be reduced. In a case in which the average particle diameter is greater than 10 μm, the thickness of a porous coating layer may not only be increased, but a phenomenon may also occur in which the inorganic particles are agglomerated. Thus, the mechanical strength may be reduced while the inorganic particles are exposed to the outside of the gel polymer electrolyte.

The gel polymer electrolyte of the present invention as described above may have a Li$^+$ ionic conductivity of greater than $1.0 \times 10^{-4}$ S/cm, for example, $1.0 \times 10^{-4}$ S/cm to $2.0 \times 10^{-2}$ S/cm when measured at a temperature of 25° C. by an impedance measurement and analysis system.

In this case, the ionic conductivity was measured by configuring a 13 mm thick gel polymer electrolyte film into the form of a SUS/GPE/SUS cell and using an impedance measurement method. Model VMP3 from Bio-Logic SAS was used as a measurement instrument, and the measurement was performed at room temperature under conditions of 10,000 Hz to 0.1 Hz with an amplitude of 10 mV.

Also, the gel polymer electrolyte may have a Li$^+$ ion transfer coefficient of 0.3 or more based on nuclear magnetic resonance (NMR) measurement at a temperature of 25° C. In this case, the Li$^+$ ion transfer coefficient may be defined as Li$^+$ ion diffusivity/(Li$^+$ ion diffusivity+anion diffusivity), and the Li$^+$ ion diffusivity and the anion diffusivity may be measured by the following equipment and methods.

For example, Varian 500 MHz NMR/dual probe was used, the Li$^+$ ion diffusivity (cation diffusion constant) was measured using $^7$Li diffusion NMR, and the anion diffusivity (anion diffusion constant) was measured using $^{19}$F diffusion NMR. A solvent used in this case was acetone-d$_6$, and, in order to measure a diffusion value of a sample itself, an inner tube (acetone-d$_6$) was used to prevent the mixing of the sample and the deuterium solvent. Also, as a pulse sequence in the measurement experiment, stimulated echo with gradient pulse was used. A gradient amplitude was adjusted so that a peak intensity of the maximum gradient power was about 2% to about 5% of a peak intensity of the minimum gradient power, this range was divided into 16 steps in the same manner as solution NMR, and 16 different amplitudes were applied to each sample.

Furthermore, the gel polymer electrolyte may have a gel content of about 1 wt % or more, for example, about 20 wt % or more, at a temperature of 25° C.

Also, the gel polymer electrolyte may have an amount of the unreacted oligomer of 20% or less based on a total input of the reactive oligomer at a temperature of 25° C.

The gel polymer electrolyte is obtained, the gel polymer electrolyte is then solvent (acetone)-extracted, and subsequently, the amount of the unreacted oligomer may be confirmed by the NMR measurement of the extracted solvent.

In the gel polymer electrolyte of the present invention, the electrolyte solution is composed of a typical lithium salt-containing non-aqueous solvent, and, in this case, the lithium salt may include any one selected from the group consisting of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$, $LiC_4BO_8$, LiTFSI, and LiFSI, or a mixture of two or more thereof, but the present invention is not limited thereto.

The lithium salt may be included in an amount of 10 wt % to 50 wt % based on a total amount of the oligomer and a polymerization initiator.

Also, a non-aqueous solvent typically used in an electrolyte solution for a lithium secondary battery may be used as the electrolyte solution solvent of the present invention, and, for example, ether, ester (acetates and propionates), amide, linear carbonate or cyclic carbonate, and nitrile (acetonitrile, succinonitrile (SN), etc.) may be used alone or in a mixture of two or more thereof.

Among these materials, the cyclic carbonate, the linear carbonate, or a carbonate compound as a mixture thereof may be typically included.

Specific examples of the cyclic carbonate may be any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and a halide thereof, or a mixture of two or more thereof. Also, specific examples of the linear carbonate may be any one selected from the group consisting of dimethyl carbonate (DMC), diethyl carbonate (DEC), dipropyl carbonate (DPC), ethylmethyl carbonate (EMC), methylpropyl carbonate (MPC), and ethylpropyl carbonate (EPC), or a mixture of two or more thereof, but the present invention is not limited thereto.

In particular, since ethylene carbonate and propylene carbonate, as cyclic carbonates among the carbonate-based electrolyte solution solvents, are highly viscous organic solvents and have high dielectric constants, the ethylene carbonate and propylene carbonate may well dissociate the lithium salt in the electrolyte solution. Thus, the ethylene carbonate and propylene carbonate may be used. Since an electrolyte solution having high electrical conductivity may be prepared when the above cyclic carbonate is mixed with low viscosity, low dielectric constant linear carbonate, such as ethylmethyl carbonate, diethyl carbonate, and dimethyl carbonate, in an appropriate ratio, the ethylene carbonate and propylene carbonate, for example, may be used.

Also, as the ester among the electrolyte solution solvents, any one selected from the group consisting of methyl acetate, ethyl acetate, propyl acetate, methyl propionate, ethyl propionate, γ-butyrolactone, γ-valerolactone, γ-caprolactone, α-valerolactone, and ε-caprolactone, or a mixture of two or more thereof may be used, but the present invention is not limited thereto.

Furthermore, the performance of the electrolyte solution solvent may be improved by adding a typical additive which is used in the electrolyte solution. For example, the electrolyte solution solvent may further include a typical additive, such as VC, VEC, propane sultone, SN, AdN, ESa, PRS, FEC, $LiPO_2F_2$, LiODFB, LiBOB, TMSPa, TMSPi, TFEPa, and TFEPi, without limitation.

With respect to a typical electrolyte, metal ions dissolved from a positive electrode are precipitated at a negative electrode. In contrast, since the gel polymer electrolyte of the present invention includes a polymer network formed by an oligomer, the gel polymer electrolyte of the present invention may reduce the precipitation of metal at the negative electrode which is caused by the bonding of the metal ions dissolved from the positive electrode. Thus, charge and discharge efficiency of the lithium secondary battery may be improved and good cycle characteristics may be obtained. In addition, the gel polymer electrolyte of the present invention may form a protective layer, which is composed of a polymer, on the surfaces of the positive electrode and negative electrode or may suppress a side reaction by anion stabilization and increase adhesion between the electrodes by using a polymer structure. Thus, the gel polymer electrolyte of the present invention may suppress the generation of gas in the battery at high temperature. Also, the strengthening of the separator through the gel polymer, the consequent improvement of penetration safety, and the improvement of stability, for example, flame retardancy and overcharge through the reduction of volatility, may be possible.

Also, the present invention may provide a gel polymer electrolyte including:

unit A derived from a monomer including at least one copolymerizable acrylate or acrylic acid;

unit C including urethane; and unit E including siloxane.

Furthermore, the present invention may provide a gel polymer electrolyte including:

an oligomer which includes unit E including siloxane, wherein the gel polymer electrolyte has a $Li^+$ ionic conductivity of $1.0 \times 10^{-4}$ S/cm to $2.0 \times 10^{-2}$ S/cm, a $Li^+$ ion transfer coefficient of 0.3 or more, and an amount of the unreacted oligomer of 20% or less based on a total input of the reactive oligomer at a temperature of 25° C.

According to another embodiment of the present invention, the present invention may provide a composition for the gel polymer electrolyte of the present invention including:

a lithium salt;

an electrolyte solution solvent;

a polymerization initiator; and an oligomer which includes unit A derived from a monomer including at least one copolymerizable acrylate or acrylic acid, unit C including urethane, and unit E including siloxane.

In this case, the oligomer may be included in an amount of 0.5 wt % to 20 wt %, for example, 0.5 wt % to 10 wt %, based on a total weight of the composition for the gel polymer electrolyte. In a case in which the amount of the oligomer is less than 0.5 wt %, since gelation may be difficult, characteristics of the gel polymer electrolyte may be difficult to be achieved. In a case in which the amount of the oligomer is greater than 20 wt %, since the resistance may be increased due to the excessive amount of the oligomer, the performance of the battery may be degraded.

In this case, in the present invention, the gel polymer electrolyte of the present invention may be prepared from the composition for the gel polymer electrolyte by using a conventionally known polymerization method.

A typical polymerization initiator known in the art may be used as the polymerization initiator used for the above reaction.

Non-limiting examples of the polymerization initiator may be organic peroxides or hydroperoxides, such as benzoyl peroxide, acetyl peroxide, dilauryl peroxide, di-tert-butyl peroxide, t-butyl peroxy-2-ethyl-hexanoate, cumyl hydroperoxide, and hydrogen peroxide, and azo compounds such as 2,2'-azobis(2-cyanobutane), 2,2'-azobis(methylbutyronitrile), 2,2'-azobis(iso-butyronitrile) (AIBN), and 2,2'-azobis(dimethylvaleronitrile) (AMVN), but the present invention is not limited thereto.

The polymerization initiator may be dissociated by heat in the battery, for a non-limiting example, at a temperature of 30° C. to 100° C. or may be dissociated at room temperature (5° C. to 30° C.) to form a radical, and a polymerizable monomer may be reacted with an acrylate-based compound by free radical polymerization to form a gel polymer electrolyte.

Also, the polymerization initiator may be used in an amount of 0.01 wt % to 2 wt % based on a total amount of the oligomer. In a case in which the amount of the polymerization initiator is greater than 2 wt %, the gelation may occur too quickly during the injection of the composition for the gel polymer electrolyte into the battery or the unreacted initiator may remain to adversely affect the battery performance afterwards. In contrast, in a case in which the amount of the polymerization initiator is less than 0.01 wt %, the gelation may not be well performed.

In order to provide effects of increasing the efficiency of the gel reaction and decreasing the resistance, the composition for the gel polymer electrolyte according to the embodiment of the present invention may selectively further include other additives known in the art which may realize the above physical properties, in addition to the above-described components.

The performance of the gel polymer electrolyte may be improved by adding a typical additive used in the electrolyte solution. For example, a typical additive, such as VC, VEC, propane sultone, SN, AdN, ESa, PRS, FEC, $LiPO_2F_2$, LiODFB, LiBOB, TMSPa, TMSPi, TFEPa, and TFEPi, may be used.

According to another embodiment of the present invention, the present invention provides a lithium secondary battery including:

a positive electrode and a negative electrode capable of intercalating and deintercalating lithium, and a polymer electrolyte disposed between the positive electrode and the negative electrode, wherein the polymer electrolyte includes the gel polymer electrolyte of the present invention.

The gel polymer electrolyte is formed by polymerizing the composition for the gel polymer electrolyte according to a typical method known in the art. For example, the gel polymer electrolyte may be formed by in-situ polymerization of the composition for the gel polymer electrolyte in the secondary battery.

According to an exemplary embodiment of the present invention, the present invention may include (a) inserting an electrode assembly formed of a positive electrode, a negative electrode, and a separator disposed between the positive electrode and the negative electrode into a battery case, and (b) injecting the composition for the gel polymer electrolyte according to the present invention into the battery case and polymerizing the composition to form a gel polymer electrolyte.

An in-situ polymerization reaction in the lithium secondary battery may be performed by using E-beam, γ-ray, and room temperature/high temperature aging processes, and, according to an embodiment of the present invention, the in-situ polymerization reaction may be performed by heat polymerization. In this case, polymerization time required may be in a range of about 2 minutes to about 12 hours, and heat polymerization temperature may be in a range of 30° C. to 100° C.

Specifically, in the in-situ polymerization reaction in the lithium secondary battery, predetermined amounts of an initiator and the oligomer are added to an electrolyte solution containing a lithium salt and mixed, and the mixture is then injected into a battery cell. When an electrolyte injection hole of the battery cell is sealed and polymerization is then performed by heating the battery cell to 40° C. to 80° C. for 1 hour to 20 hours, a gel polymer electrolyte in the form of a gel is prepared through the gelation of the lithium salt-containing electrolyte solution.

The lithium secondary battery according to the embodiment of the present invention has a charge voltage ranging from 3.0 V to 5.0 V, and thus, capacity characteristics of the lithium secondary battery may be excellent in both normal and high voltage ranges.

According to an embodiment of the present invention, an electrode constituting the lithium secondary battery may be prepared by a typical method known in the art. For example, a binder, a conductive agent, and a dispersant, if necessary, as well as a solvent are mixed with an electrode active material and stirred to prepare a slurry, and a metal current collector is then coated with the slurry and pressed. Thereafter, the electrode may be prepared by drying the metal current collector.

According to an embodiment of the present invention, any compound may be used as a positive electrode active material constituting the positive electrode as long as it may be used at a normal voltage or high voltage and may reversibly intercalate/deintercalate lithium.

Specifically, the positive electrode active material, for example, may include any one selected from the group consisting of $LiCoO_2$, $LiNiO_2$, $LiMnO_2$, $LiMn_2O_4$, $LiNi_{1-y}Co_yO_2$ (0≤y<1), $LiCo_{1-y}Mn_yO_2$ (0≤y<1), $LiNi_{1-y}Mn_yO_2$ (0≤y<1), and $Li(Ni_aCo_bMn_c)O_2$ (0<a, b, c≤1, a+b+c=1), or a mixture of two or more thereof, but the present invention is not limited thereto. Also, sulfide, selenide, and halide may be included in addition to the above oxides.

Furthermore, according to an embodiment of the present invention, a carbon material, lithium metal, silicon, or tin, which may intercalate and deintercalate lithium ions, may be typically used as a negative electrode active material constituting the negative electrode. For example, the carbon material may be used, and both low crystalline carbon and high crystalline carbon may be used as the carbon material. Typical examples of the low crystalline carbon may be soft carbon and hard carbon, and typical examples of the high crystalline carbon may be natural graphite, Kish graphite, pyrolytic carbon, mesophase pitch-based carbon fibers, meso-carbon microbeads, mesophase pitches, and high-temperature sintered carbon such as petroleum or coal tar pitch derived cokes.

A slurry is prepared by mixing and stirring the positive and/or negative electrode active material, a binder, a solvent, and a conductive agent and a dispersant which may be typically used if necessary. Then, the positive and/or negative electrode may be prepared by coating a current collector with the slurry and pressing the coated current collector.

Various types of binder polymers, such as a polyvinylidene fluoride-hexafluoropropylene copolymer (PVDF-co-HFP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylate, an ethylene-propylene-diene monomer (EPDM), a sulfonated EPDM, a styrene-butadiene rubber (SBR), a fluorine rubber, and various copolymers, may be used as the binder.

Also, a separator may exist between the positive electrode and the negative electrode according to the type of the lithium secondary battery. A typical porous polymer film, i.e., polyethylene, polypropylene, polyvinylidene fluoride, or a multilayer having two or more layers thereof may be used as the separator, and a mixed multilayer, such as a double-layered separator of polyethylene/polypropylene, a triple-layered separator of polyethylene/polypropylene/polyethylene, and a triple-layered separator of polypropylene/polyethylene/polypropylene, may also be used as the separator. Furthermore, a typical porous nonwoven fabric, for example, a nonwoven fabric formed of high melting point glass fibers or polyethylene terephthalate fibers may be used, but the present invention is not limited thereto.

A shape of the lithium secondary battery according to an embodiment of the present invention is not particularly limited, and for example, a cylindrical type using a can, a prismatic type, a pouch type, or a coin type may be used.

According to another embodiment of the present invention, the present invention may further provide an electrochromic device including:

a first electrode, a second electrode, an electrochromic material, and the gel polymer electrolyte of the present invention.

In this case, the first electrode and the second electrode have a structure in which a transparent conductive layer is formed on a base material, and the electrochromic device may include a flexible substrate and a rigid substrate on opposite sides of the electrolyte.

Thus, in a case in which the gel polymer electrolyte of the present invention is used for the flexibility and durability of the electrochromic device and a degree of freedom in design, ionic conductivity required for driving the device and the durability may be secured.

In this case, the base material and the transparent conductive layer are not particularly limited as long as they are known in the art. Examples of the base material may be glass and transparent plastic (polymer), and examples of a conductive material for the formation of the transparent conductive layer may be indium doped tin oxide (ITO), antimony doped tin oxide (ATO), fluorine doped tin oxide (FTO), Indium doped zinc oxide (IZO), and ZnO. The transparent conductive layer may be formed by depositing the conductive material on the base material using a known method such as sputtering, electron beam deposition, chemical vapor deposition, and a sol-gel coating method.

Also, the type of the electrochromic material is not particularly limited, and the electrochromic material may include an inorganic metal oxide such as $WO_3$, $Ir(OH)_x$, $MoO_3$, $V_2O_5$, $TiO_2$, and NiO; a conductive polymer such as polypyrrole, polyaniline, polyazulene, polypyridine, polyindole, polycarbazole, polyazine, and polythiophene; and an organic chromic material such as viologen, anthraquinone and phenocyazine.

A method of stacking the electrochromic material on the electrode is not particularly limited as long as it is a method of forming a thin film of a predetermined height from a base surface according to a surface profile, and, for example, the method may include a vacuum deposition method such as sputtering.

Among the above electrochromic materials, $WO_3$, for example, is a material colored by a reduction reaction, and NiO is a material colored by an oxidation reaction. An electrochemical mechanism, by which electrochromism occurs in the electrochromic device including the above inorganic metal oxide, may be described as Reaction Formula 1. Specifically, when a voltage is applied to the electrochromic device, protons ($H^+$) or lithium ions ($Li^+$) included in the electrolyte are intercalated into or deintercalated from the electrochromic material depending on the polarity of the current, and, in this case, since the oxidation number of transition metal included in the electrochromic material may be changed in order to satisfy the charge neutral condition of the compound, optical properties, e.g., transmittance (color), of the electrochromic material itself may be changed.

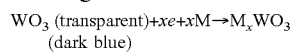
$WO_3$ (transparent)+$xe$+$xM$→$M_xWO_3$
(dark blue)                    [Reaction Formula 1]

(where M is a proton or alkali metal cation, e.g., $Li^+$)

The electrochromic device thus configured may be manufactured according to a typical method known in the art, and, for example, the method may include the steps of: (a) preparing a first electrode and a second electrode; (b) sealing after injecting the gel polymer electrolyte composition according to the present invention between the first electrode and second electrode prepared; and (c) forming a gel polymer electrolyte by polymerizing the injected electrolyte composition.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Preparation of Composition for Gel Polymer Electrolyte

Example 1

An electrolyte solution was prepared by dissolving $LiPF_6$ in a non-aqueous electrolyte solution solvent having a composition, in which a volume ratio of ethylene carbonate (EC):ethylmethyl carbonate (EMC):dimethyl carbonate (DMC) was 2:3:5, to obtain a $LiPF_6$ concentration of 1 M. A composition for a gel polymer electrolyte was prepared by adding 5% of the oligomer of Formula 7a (molecular weight of 7,800, 2 mols of unit A, molar ratio of unit B:unit C:unit D:unit E was 4.7:33.4:14.3:47.6), 0.5 wt % of 2,2'-azobis (iso-butyronitrile) (AIBN) as a polymerization initiator based on a total amount of the oligomer, and 0.5% of vinylene carbonate (VC).

Example 2

An electrolyte solution was prepared by dissolving $LiPF_6$ in a non-aqueous electrolyte solution solvent having a composition, in which a volume ratio of ethylene carbonate (EC):ethylmethyl carbonate (EMC):dimethyl carbonate (DMC) was 2:3:5, to obtain a LiPF$_6$ concentration of 1 M. A composition for a gel polymer electrolyte was prepared by adding 5% of the oligomer of Formula 7b (molecular weight of 8,500, 2 mols of unit A, molar ratio of unit C:unit D:unit E was 30:26:44), 0.5 wt % of AIBN as a polymerization initiator based on a total amount of the oligomer, and 0.5% of VC.

Example 3

An electrolyte solution was prepared by dissolving LiPF$_6$ in a non-aqueous electrolyte solution solvent having a composition, in which a volume ratio of ethylene carbonate (EC):ethylmethyl carbonate (EMC):dimethyl carbonate (DMC) was 2:3:5, to obtain a LiPF$_6$ concentration of 1 M. A composition for a gel polymer electrolyte was prepared by adding 5% of the oligomer of Formula 7c (molecular weight of 8,500, 1 mol of unit A, molar ratio of unit C:unit D:unit E was 30:26:44), 0.5 wt % of AIBN as a polymerization initiator based on a total amount of the oligomer, and 0.5% of VC.

Example 4

An electrolyte solution was prepared by dissolving LiPF$_6$ in a non-aqueous electrolyte solution solvent having a composition, in which a volume ratio of ethylene carbonate (EC):ethylmethyl carbonate (EMC):dimethyl carbonate (DMC) was 2:3:5, to obtain a LiPF$_6$ concentration of 1 M. A composition for a gel polymer electrolyte was prepared by adding 5% of the oligomer of Formula 7d (molecular weight of 8,100, 2 mols of unit A, molar ratio of unit B:unit C:unit D:unit E was 4.7:33.4:14.3:47.6), 0.5 wt % of AIBN as a polymerization initiator based on a total amount of the oligomer, and 0.5% of VC.

Example 5

A composition for a gel polymer electrolyte was prepared in the same manner as in Example 1 except that 12% of the oligomer of Formula 7a was included.

Example 6

An electrolyte solution was prepared by dissolving LiPF$_6$ in a non-aqueous electrolyte solution solvent having a composition, in which a volume ratio of ethylene carbonate (EC):ethylmethyl carbonate (EMC):dimethyl carbonate (DMC) was 2:3:5, to obtain a LiPF$_6$ concentration of 1 M. A composition for a gel polymer electrolyte was prepared by adding 5% of an oligomer (2 mols of unit A, molar ratio of unit C:unit E was 1:1, average molecular weight of 10,000), 0.5 wt % of AIBN as a polymerization initiator based on a total amount of the oligomer, and 0.5% of VC.

Comparative Example 1

An electrolyte solution was prepared by dissolving LiPF$_6$ in a non-aqueous electrolyte solution solvent having a composition, in which a volume ratio of ethylene carbonate (EC):ethylmethyl carbonate (EMC):dimethyl carbonate (DMC) was 2:3:5, to obtain a LiPF$_6$ concentration of 1 M.

Subsequently, a composition for a gel polymer electrolyte was prepared in the same manner as in Example 1 except that an oligomer composed of dipentaerythritol pentaacrylate, which did not include unit C including urethane and unit E including siloxane, but only included unit A derived from a monomer including acrylate among the units constituting the oligomer of the present invention, was used.

Comparative Example 2

An electrolyte solution was prepared by dissolving LiPF$_6$ in a non-aqueous electrolyte solution solvent having a composition, in which a volume ratio of ethylene carbonate (EC):ethylmethyl carbonate (EMC):dimethyl carbonate (DMC) was 2:3:5, to obtain a LiPF$_6$ concentration of 1 M.

Subsequently, a composition for a gel polymer electrolyte was prepared in the same manner as in Example 1 except that an oligomer represented by the following Formula 8, which did not include unit E including siloxane, but was composed of unit A derived from a monomer including acrylate and unit C including urethane among the units constituting the oligomer of the present invention, was used.

[Formula 8]

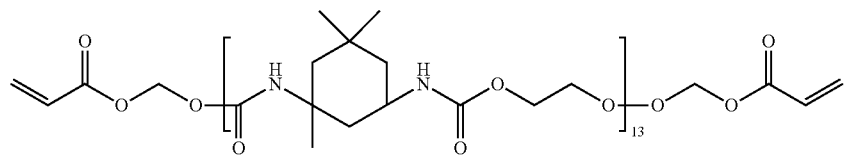

Preparation of Secondary Battery

Example 7

A positive electrode mixture slurry was prepared by adding 94 wt % of LiNi$_{1/3}$Co$_{1/3}$Mn$_{1/3}$O$_2$(NCM) as a positive electrode active material, 3 wt % of carbon black as a conductive agent, and 3 wt % of polyvinylidene fluoride (PVDF) as a binder to N-methyl-2-pyrrolidone (NMP) as a solvent. An about 20 μm thick aluminum (Al) thin film as a positive electrode current collector was coated with the positive electrode mixture slurry and dried, and the Al thin film was then roll-pressed to prepare a positive electrode.

A negative electrode mixture slurry was prepared by adding 96 wt % of carbon powder as a negative electrode active material, 3 wt % of PVDF as a binder, and 1 wt % of carbon black as a conductive agent to NMP as a solvent. A 10 μm thick copper (Cu) thin film as a negative electrode current collector was coated with the negative electrode mixture slurry and dried, and the Cu thin film was then roll-pressed to prepare a negative electrode.

A battery was assembled using the positive electrode, the negative electrode, and a separator formed of three layers of polypropylene/polyethylene/polypropylene (PP/PE/PP), and the composition for a gel polymer electrolyte prepared in Example 1 was injected into the assembled battery. Then, after the assembled battery was left standing for 2 days, a secondary battery including a gel polymer electrolyte was prepared by heating the assembled battery at 70° C. for 5 hours.

Example 8

A secondary battery including a gel polymer electrolyte was prepared in the same manner as in Example 7 except that the composition for a gel polymer electrolyte of Example 2 was injected instead of injecting the composition for a gel polymer electrolyte of Example 1.

Example 9

A secondary battery including a gel polymer electrolyte was prepared in the same manner as in Example 7 except that the composition for a gel polymer electrolyte of Example 5 was injected instead of injecting the composition for a gel polymer electrolyte of Example 1.

Example 10

A secondary battery including a gel polymer electrolyte was prepared in the same manner as in Example 7 except that the composition for a gel polymer electrolyte of Example 6 was injected instead of injecting the composition for a gel polymer electrolyte of Example 1.

Comparative Example 3

A secondary battery including a gel polymer electrolyte was prepared in the same manner as in Example 7 except that the composition for a gel polymer electrolyte of Comparative Example 1 was injected instead of injecting the composition for a gel polymer electrolyte of Example 1.

Comparative Example 4

A secondary battery including a gel polymer electrolyte was prepared in the same manner as in Comparative Example 3 except that the composition for a gel polymer electrolyte of Comparative Example 2 was injected instead of injecting the composition for a gel polymer electrolyte of Comparative Example 1.

Experimental Example 1: Ionic Conductivity Measurement

The compositions for a gel polymer electrolyte prepared in Examples 1, 2, 5, and 6 and the composition for a gel polymer electrolyte prepared in Comparative Example 1 were prepared in the form of 13 mm thick films, and $Li^+$ ionic conductivity was measured by configuring each 13 mm thick gel polymer electrolyte film into the form of a SUS/GPE/SUS cell and using an impedance measurement method. Model VMP3 from Bio-Logic SAS was used as a measurement instrument, and the measurement was performed at room temperature (25° C.) under conditions of 10,000 Hz to 0.1 Hz with an amplitude of 10 mV. The results thereof are presented in Table 1 below.

TABLE 1

|  | Ionic conductivity |
|---|---|
| Example 1 | 8.4 mS/cm |
| Example 2 | 8.1 mS/cm |

TABLE 1-continued

|  | Ionic conductivity |
|---|---|
| Example 5 | 6.5 mS/cm |
| Example 6 | 4.8 mS/cm |
| Comparative Example 1 | 7.0 mS/cm |

As illustrated in Table 1, in a case in which the compositions for a gel polymer electrolyte prepared in Examples 1 and 2 of the present invention were used, it may be confirmed that $Li^+$ ionic conductivities were improved by about 10% or more in comparison to that of the composition for a gel polymer electrolyte of Comparative Example 1 including a typical acrylate-based oligomer. Also, in a case in which the amount of the oligomer was greater than 10% as in Example 5, it may be understood that the ionic conductivity was increased by about 25% or more in comparison to that of the composition for a gel polymer electrolyte of Example 6.

However, with respect to Example 6, it may be understood that the ionic conductivity was reduced in comparison to that of Example 1.

From the above results, in a case in which the molar ratio of the units constituting the oligomer was appropriately adjusted as in the present invention, it may be confirmed that an effect of improving the ionic conductivity in comparison to a typical gel polymer electrolyte may be obtained.

Experimental Example 2

The compositions for a gel polymer electrolyte prepared in Examples 1, 2, 5, and 6 and Comparative Example 1 were put in an inner tube for nuclear magnetic resonance (NMR) measurement, GPE was polymerized on the outside of the inner tube, and acetone-$d_6$ was then put in the inner tube. Then, a $Li^+$ ion transfer coefficient was measured by using the following measurement method. The results thereof are presented in Table 2 below.

[Measurement Method]

$Li^+$ ion transfer coefficient=$Li^+$ ion diffusivity/($Li^+$ ion diffusivity+anion diffusivity)

NMR equipment: Varian 500 MHz NMR/dual probe
$Li^+$ ion diffusivity: measured using $^7Li$ diffusion NMR
<$^7Li$ Diffusion NMR Experimental Conditions>
Diffusion gradient length: 4.0 msec
Diffusion delay: 200.0 msec
Lowest gradient value: 100
Highest gradient value: 30,000
Number of increments: 16
Anion diffusivity: measured using $^{19}F$ diffusion NMR.
<$^{19}F$ Diffusion NMR Experimental Conditions>
Diffusion gradient length: 3.0 msec
Diffusion delay: 70.0 msec
Lowest gradient value: 1,000
Highest gradient value: 23,000
Number of increments: 16
Solvent used: acetone-$d_6$ (in this case, in order to measure a diffusion value of a sample itself, an inner tube (acetone-$d_6$) was used to prevent the mixing of the sample and the deuterium solvent.)
Pulse sequence: stimulated echo with gradient pulse
Gradient amplitude: a gradient amplitude was adjusted so that a peak intensity of the maximum gradient power was about 2% to about 5% of a peak intensity of the minimum gradient power, this range was divided into 16 steps in the same manner as solution NMR, and 16 different amplitudes were applied to each sample.

TABLE 2

| Composition for gel polymer electrolyte | Li+ ion transfer coefficient |
|---|---|
| Example 1 | 0.435 |
| Example 2 | 0.420 |
| Example 5 | 0.382 |
| Example 6 | 0.310 |
| Comparative Example 1 | 0.402 |

As illustrated in Table 2, in a case in which the compositions for a gel polymer electrolyte prepared in Examples 1 and 2 of the present invention were used, it may be confirmed that Li+ ion transfer coefficients were improved by about 4% or more in comparison to that of the composition for a gel polymer electrolyte of Comparative Example 1 including a typical acrylate-based oligomer.

Also, in a case in which the amount of the oligomer was greater than 10% as in Example 5, it may be understood that the Li+ ion transfer coefficient was increased by about 15% or more in comparison to that of the composition for a gel polymer electrolyte of Example 6.

However, with respect to Example 6, it may be understood that the Li+ ion transfer coefficient was reduced in comparison to that of Example 1.

From the above results, in a case in which the molar ratio of the units constituting the oligomer was appropriately adjusted as in the present invention, it may be confirmed that an effect of improving the Li+ ion transfer coefficient in comparison to a typical gel polymer electrolyte may be obtained.

Experimental Example 3

Gel polymer electrolytes were realized in the secondary batteries prepared in Examples 7 to 10 and Comparative Example 3, and the gel polymer electrolytes were then solvent (acetone)-extracted. Subsequently, a remaining amount of the unreacted oligomer was analyzed from the extracted solvent through NMR measurement. The results thereof are presented in Table 3 below.

TABLE 3

| Secondary battery | Unreacted oligomer (wt %) |
|---|---|
| Example 7 | N.D |
| Example 8 | 0.5% |
| Example 9 | N.D |
| Example 10 | 2% |
| Comparative Example 3 | 3.0% |

As illustrated in Table 3, the amounts of the unreacted oligomers of the secondary batteries of Examples 7 to 10 were 2% or less, but the amount of the unreacted oligomer of the secondary battery of Comparative Example 3 was 3%, wherein it may be understood that the amount of the unreacted oligomer was high.

In a case in which the amount of the unreacted oligomer was high, since the resistance and the side reaction in the gel polymer electrolyte were increased, cycle life characteristics of the secondary battery may be reduced.

Accordingly, with respect to the secondary batteries of Examples 7 to 10, since the side reaction and resistance may be reduced in comparison to those of the secondary battery of Comparative Example 3, it may be understood that the cycle life characteristics of the batteries may be improved.

Experimental Example 4: Charge and Discharge Test

The secondary batteries (design capacity: 760 mAh) prepared in Examples 7 to 10 and the secondary battery of Comparative Example 3 were charged at a constant current of 1.0 C to a voltage of 4.15 V and were subsequently charged at a constant voltage of 4.15 V until the current was reduced to reach 1/20 C. Thereafter, the batteries were discharged at a constant current of 1.0 C to a voltage of 2.5 V. The charge and discharge were repeated for 100 cycles.

Capacity retention ratios were calculated from the above results using the following equation, and the results thereof are presented in Table 4 and FIG. 1 below.

<Equation>

Capacity retention ratio in a $100^{th}$ cycle=discharge capacity in the $100^{th}$ cycle/discharge capacity in the 1st cycle

TABLE 4

| | $1^{st}$ cycle discharge capacity | $100^{th}$ cycle discharge capacity | Capacity retention ratio (%) in the $100^{th}$ cycle |
|---|---|---|---|
| Example 7 | 754 mAh | 739 mAh | 98% |
| Example 8 | 751 mAh | 728 mAh | 97% |
| Example 9 | 730 mAh | 715 mAh | 98% |
| Example 10 | 683 mAh | 417 mAh | 61% |
| Comparative Example 3 | 720 mAh | 117 mAh | 16.2% |

As illustrated in Table 4, it may be understood that the secondary batteries of Examples 7 to 10, particularly, the secondary batteries of Examples 7 and 8, respectively had better capacity retention ratios than the secondary battery of Comparative Example 3 after the charge and discharge.

Experimental Example 5

Surface tension was measured for each of the compositions for a gel polymer electrolyte prepared in Example 1 and Comparative Example 2 at 25° C. using a ring method (KRUSS tensiometer, K11 model). The results thereof are presented in Table 5 below.

TABLE 5

| | Surface tension (mN/m) |
|---|---|
| Example 1 | 29 mN/m |
| Comparative Example 2 | 21 mN/m |

As illustrated in Table 5, with respect to the gel polymer electrolyte of the present invention which included the oligomer including units B, C, D, and E, it may be understood that surface tension was higher than that of the gel polymer electrolyte of Comparative Example 2 which included the oligomer simply including the acrylate unit and urethane unit.

Form the above results, with respect to the gel polymer electrolyte of the present invention which included the oligomer, particularly, the oligomer including unit E, the affinity to the separator may be improved due to the high surface tension, and accordingly, since the resistance was reduced, it may be estimated that the ionic conductivity and cycle life characteristics may be improved.

Experimental Example 6

The batteries including the gel polymer electrolytes, which were prepared in Example 7 and Comparative Example 4, were disassembled to respectively separate the separators impregnated in the gel polymer electrolytes. Then, the separated separators were left standing for about 30 minutes in chambers at a temperature of 60° C. and 120° C. to compare shrinkage areas of the separators before and after the heat treatment. The results (ratios) thereof are presented in Table 6 below.

TABLE 6

| | Area of separator (cm²) | | |
|---|---|---|---|
| | 25° C. | 60° C. | 120° C. |
| Example 7 | 20.52 | 19.76 | 19.38 |
| Comparative Example 4 | 20.52 | 14.82 | 11.55 |

As illustrated in Table 6, with respect to the separator impregnated in the gel polymer electrolyte of the present invention, it may be understood that the shrinkage of the separator at high temperature was lower than that of the separator impregnated in the gel polymer electrolyte of Comparative Example 4. From the above results, with respect to the gel polymer electrolyte of the present invention, it may be estimated that durability at high temperature may be improved, and accordingly, the lifetime characteristics of the secondary battery may be further improved.

The invention claimed is:

1. A gel polymer electrolyte comprising:
   a polymer network; and
   an electrolyte solution impregnated in the polymer network,
   wherein the polymer network is formed by combining a first oligomer represented by Formula 1, which includes unit A derived from a monomer including at least one copolymerizable acrylate or acrylic acid, unit C including urethane, and unit E including siloxane, in a three-dimensional structure, A-[C-E]$_k$-C-A   [Formula 1]

where k is an integer of 1 to 200.

2. The gel polymer electrolyte of claim 1, wherein unit A is a unit derived from at least one compound selected from the group consisting of hydroxymethyl(meth)acrylate and hydroxyethyl(meth)acrylate, or a unit represented by Formula (i):

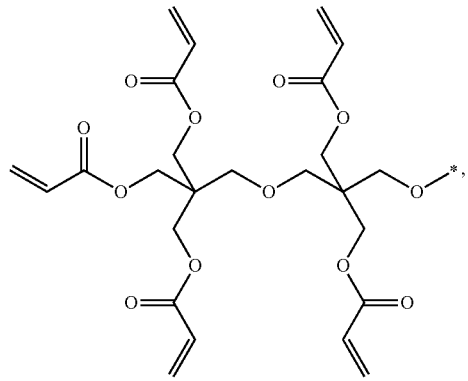

[Formula (i)]

wherein unit C comprises a unit represented by Formula 2a or Formula 2b:

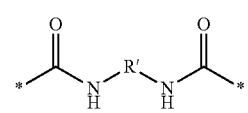

[Formula 2a]

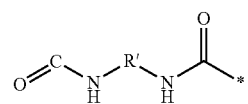

[Formula 2b]

where R' is at least one selected from the group consisting of a linear or non-linear alkylene group having 1 to 10 carbon atoms, a substituted or unsubstituted cycloalkylene group having 3 to 10 carbon atoms, a substituted or unsubstituted bicycloalkylene group having 6 to 20 carbon atoms, a substituted or unsubstituted arylene group having 6 to 20 carbon atoms, a substituted or unsubstituted biarylene group having 6 to 20 carbon atoms, a naphthalene group, and an anthracene group;

wherein unit E comprises a unit represented by Formula 3:

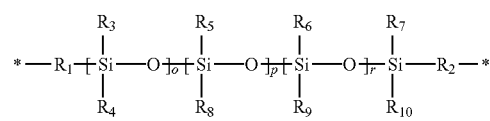

[Formula 3]

where $R_1$ and $R_2$ are a linear or non-linear alkylene group having 1 to 5 carbon atoms, $R_3$ and $R_4$ are each independently one selected from the group consisting of hydrogen, an alkyl group having 1 to 5 carbon atoms, and a phenyl group, $R_5$ to $R_{10}$ are each independently one selected from the group consisting of hydrogen, an alkyl group having 1 to 5 carbon atoms, a phenyl group, and fluorine, O is an integer of 0 or 1, P is an integer of 0 to 400, r is an integer of 1 to 400, and a molar ratio of p:r is in a range of 0:100 to 80:20.

3. The gel polymer electrolyte of claim 2, wherein R' is a compound selected from the group consisting of groups below:

(R-i)
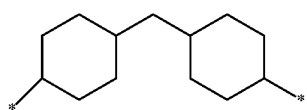
(R-ii)
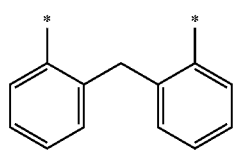
(R-iii)
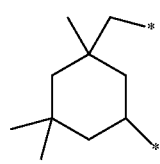
(R-iv)
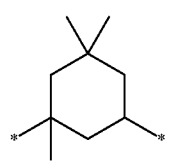
(R-v)
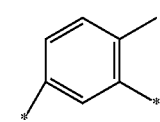
(R-vi)
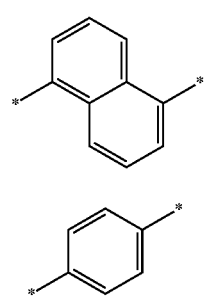
(R-vii)
(R-viii)
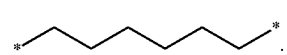
4. The gel polymer electrolyte of claim 2, wherein unit E comprises at least one compound selected from the group consisting of Formulae 3a to 3g:
[Formula 3a]
[Formula 3b]
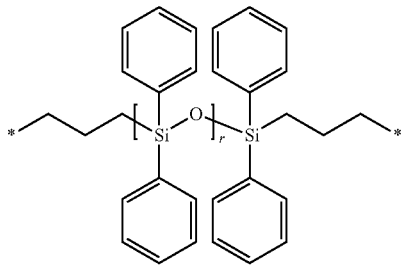
[Formula 3c]
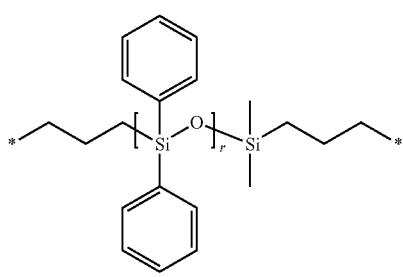
[Formula 3d]
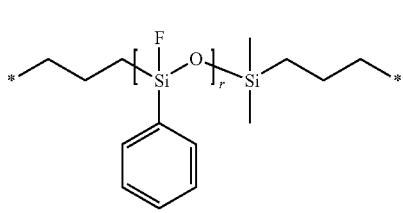
[Formula 3e]
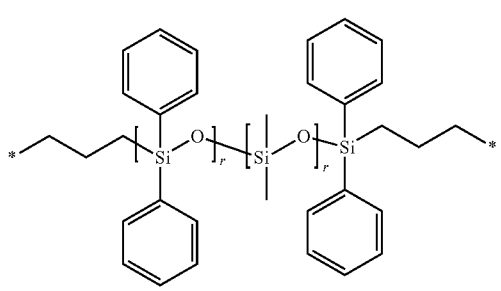
[Formula 3f]
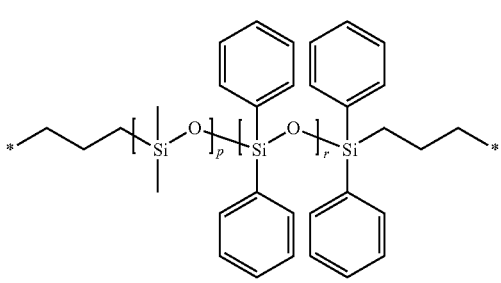

-continued

[Formula 3g]

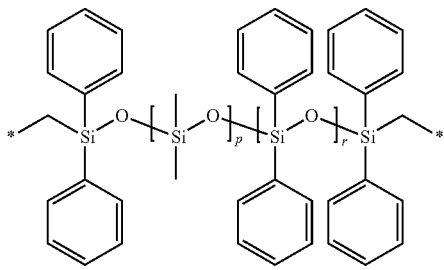

where P is 0 or an integer of 1 to 400,
r is an integer of 1 to 400, and
a molar ratio of p:r is in a range of 0:100 to 80:20.

5. The gel polymer electrolyte of claim 1, wherein an amount of unit A is 1 mol or 2 mols in 1 mol of the first oligomer, and a molar ratio of unit C:unit E is in a range of 1.005:1 to 2:1.

6. The gel polymer electrolyte of claim 1, wherein the first oligomer selectively further comprises at least one unit selected from the group consisting of unit B represented by Formula 4 and unit D represented by Formula 5:

*—CO—R"—O—*        [Formula 4]

*—O—[R'''—O]$_m$—*        [Formula 5]

where R" is a substituted or unsubstituted linear alkylene group having 1 to 10 carbon atoms, or a substituted or unsubstituted non-linear alkylene group having 1 to 10 carbon atoms, R''' is a substituted or unsubstituted linear alkylene group having 1 to 10 carbon atoms, or a substituted or unsubstituted non-linear alkylene group having 1 to 10 carbon atoms, and m is an integer of 1 to 30.

7. The gel polymer electrolyte of claim 6, wherein unit B is at least one compound selected from the group consisting of groups below:

*—CO—CH$_2$CH$_2$—O—*        (B-i)

*—CO—CHCH$_3$CH$_2$—O—*        (B-ii)

*—CO—CH$_2$CH$_2$CH$_2$CH$_2$CH$_2$—O—*        (B-iii)

*—CO—CHCH$_3$CH$_2$CH$_2$—O—*        (B-iv), and wherein unit D is at least one compound selected from the group consisting of groups below:

*—O—CH$_2$CH$_2$—O—*        (D-i)

*—O—CHCH$_3$CH$_2$—O—*        (D-ii).

8. The gel polymer electrolyte of claim 6, wherein an amount of unit A is 1 mol or 2 mols in 1 mol of the first oligomer, and a molar ratio of unit B:unit C:unit D:unit E is in a range of 0 to 35:2 to 201:0 to 35:1 to 200 (where unit B and unit D are not 0 at a same time).

9. The gel polymer electrolyte of claim 6, wherein the first oligomer is at least one compound selected from the group consisting of Formulae 7a to 7d:

[Formula 7a]

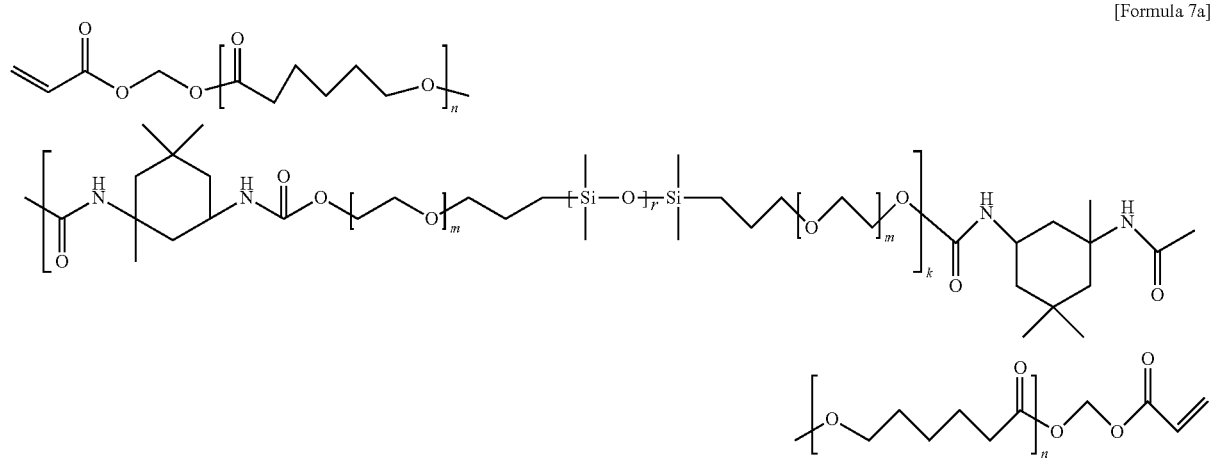

[Formula 7a]

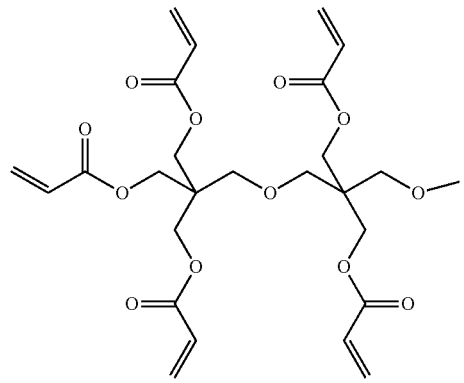

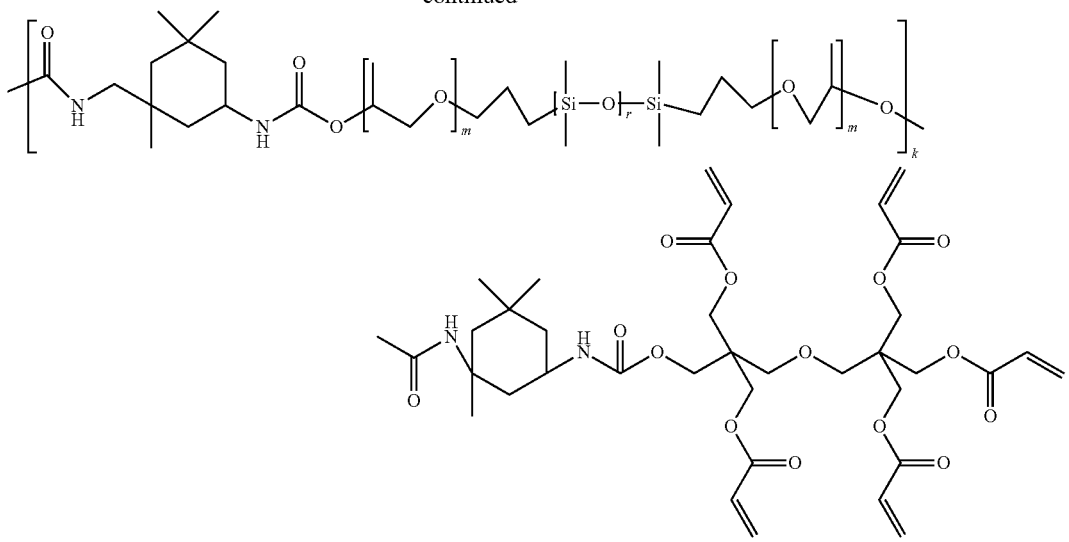
[Formula 7c]
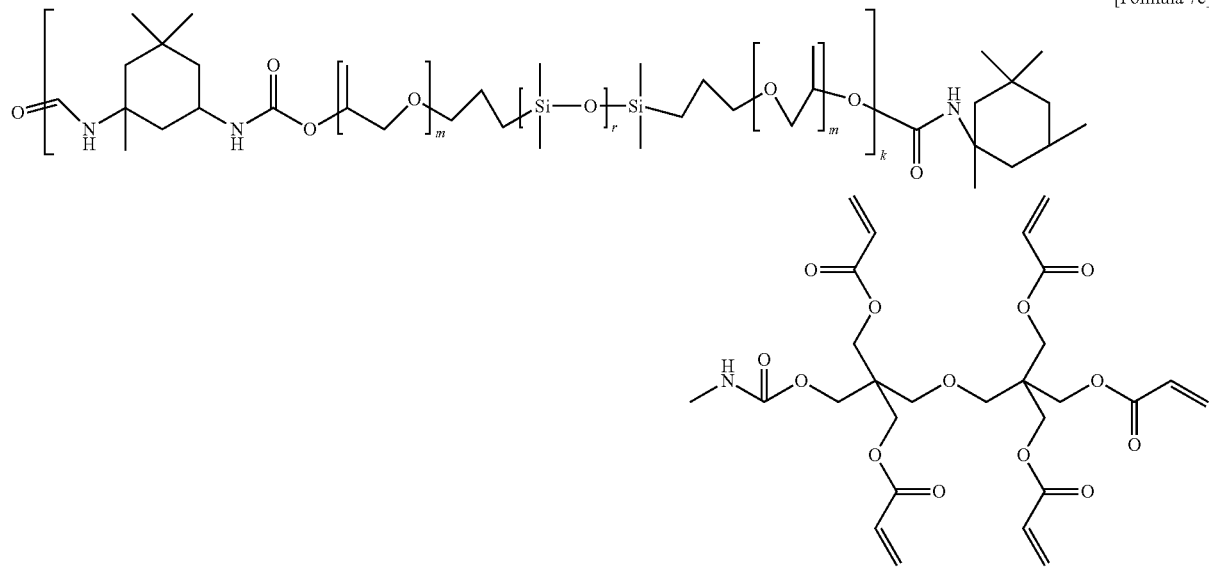
[Formula 7d]
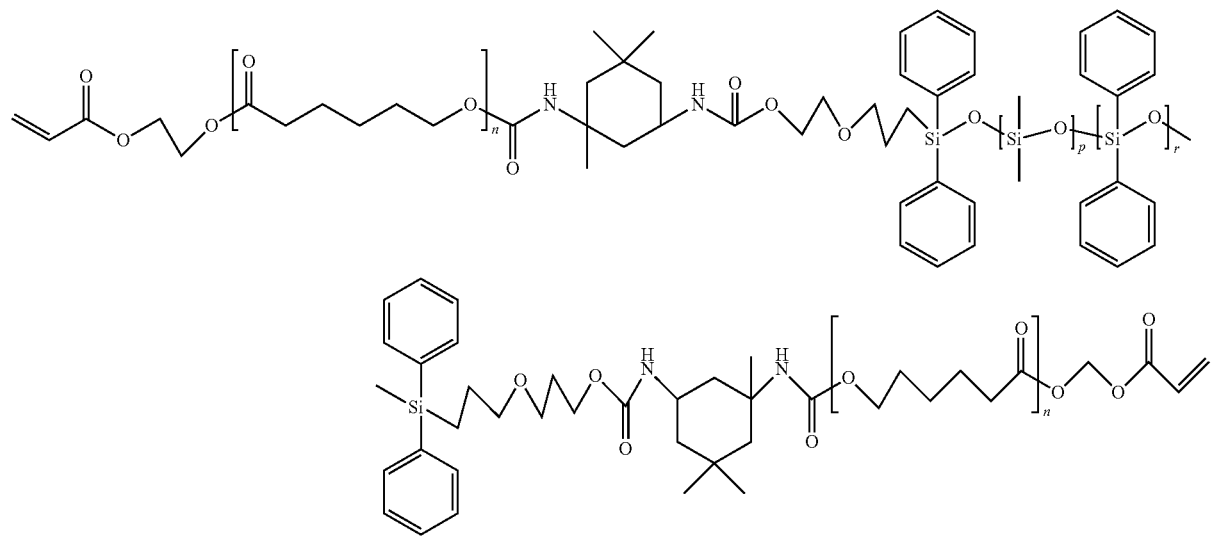

where k is an integer of 1 to 200,
n is an integer of 1 to 30,
m is an integer of 1 to 30,
P is an integer of 1 to 400,
r is an integer of 1 to 400, and
a molar ratio of p:r is in a range of 0:100 to 80:20.

10. The gel polymer electrolyte of claim 1, further comprising a second oligomer which includes a unit derived from at least one selected from the group consisting of methyl acrylate, methyl methacrylate, ethyl acrylate, ethyl methacrylate, propyl acrylate, propyl methacrylate, butyl acrylate, butyl methacrylate, hexyl acrylate, hexyl methacrylate, ethylhexyl acrylate, ethylhexyl methacrylate, 2,2,2-trifluoroethyl acrylate, 2,2,2-trifluoroethyl methacrylate, 2,2,3,3-tetrafluoropropyl acrylate, and 2,2,3,3-tetrafluoropropyl methacrylate.

11. The gel polymer electrolyte of claim 10, wherein the second oligomer is included in an amount of 50 wt % or less based on a total amount of the first oligomer.

12. The gel polymer electrolyte of claim 1, wherein the polymer network further contains inorganic particles in the polymer network.

13. A composition for a gel polymer electrolyte, the composition comprising:
a lithium salt;
an electrolyte solution solvent;
a polymerization initiator; and
a first oligomer represented by Formula 1, which includes unit A derived from a monomer including at least one copolymerizable acrylate or acrylic acid, unit C including urethane, and unit E including siloxane,

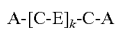 [Formula 1]

where k is an integer of 1 to 200.

14. The composition for a gel polymer electrolyte of claim 13, wherein the first oligomer is included in an amount of 0.5 wt % to 20 wt % based on a total weight of the composition for a gel polymer electrolyte.

15. The composition for a gel polymer electrolyte of claim 13, wherein unit A is a unit derived from at least one compound selected from the group consisting of hydroxymethyl(meth)acrylate and hydroxyethyl(meth)acrylate, or a unit represented by Formula (i):

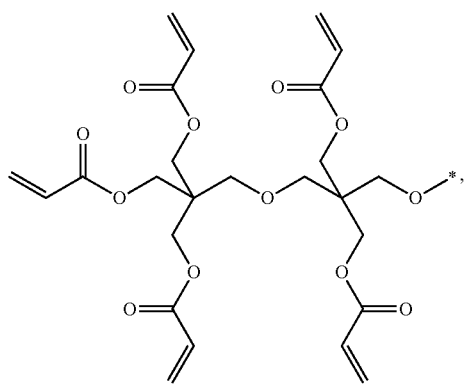 [Formula (i)]

wherein unit C comprises a unit represented by Formula 2a or Formula 2b:

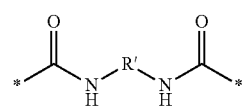 [Formula 2a]

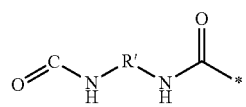 [Formula 2b]

where R' is at least one selected from the group consisting of a linear or non-linear alkylene group having 1 to 10 carbon atoms, a substituted or unsubstituted cycloalkylene group having 3 to 10 carbon atoms, a substituted or unsubstituted bicycloalkylene group having 6 to 20 carbon atoms, a substituted or unsubstituted arylene group having 6 to 20 carbon atoms, a substituted or unsubstituted biarylene group having 6 to 20 carbon atoms, a naphthalene group, and an anthracene group; and wherein unit E comprises a unit represented by Formula 3:

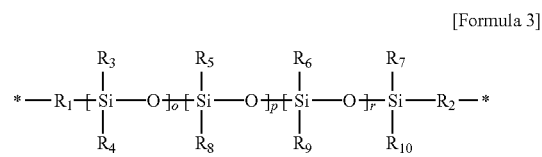 [Formula 3]

where $R_1$ and $R_2$ are a linear or non-linear alkylene group having 1 to 5 carbon atoms,
$R_3$ and $R_4$ are each independently one selected from the group consisting of hydrogen, an alkyl group having 1 to 5 carbon atoms, and a phenyl group,
$R_5$ to $R_{10}$ are each independently one selected from the group consisting of hydrogen, an alkyl group having 1 to 5 carbon atoms, a phenyl group, and fluorine,
O is an integer of 0 or 1,
P is an integer of 0 to 400,
r is an integer of 1 to 400, and
a molar ratio of p:r is in a range of 0:100 to 80:20.

16. The composition for a gel polymer electrolyte of claim 13, wherein an amount of unit A is 1 mol or 2 mols in 1 mol of the first oligomer, and a molar ratio of unit C:unit E is in a range of 1.005:1 to 2:1.

17. The composition for a gel polymer electrolyte of claim 13, wherein the first oligomer selectively further comprises at least one unit selected from the group consisting of unit B represented by Formula 4 and unit D represented by Formula 5:

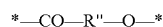 [Formula 4]

 [Formula 5]

where R" is a substituted or unsubstituted linear alkylene group having 1 to 10 carbon atoms, or a substituted or unsubstituted non-linear alkylene group having 1 to 10 carbon atoms, R''' is a substituted or unsubstituted linear alkylene group having 1 to 10 carbon atoms, or a substituted or unsubstituted non-linear alkylene group having 1 to 10 carbon atoms, and m is an integer of 1 to 30.

18. The composition for a gel polymer electrolyte of claim 17, wherein an amount of unit A is 1 mol or 2 mols in 1 mol of the oligomer, an a molar ratio of unit B:unit C:unit D:unit E is in a range of 0 to 35:2 to 20:1:0 to 35:1 to 200 (where unit B and unit D are not 0 at a same time).

19. The composition for a gel polymer electrolyte of claim 17, wherein the first oligomer is at least one compound selected from the group consisting of Formulae 7a to 7d:

[Formula 7a]

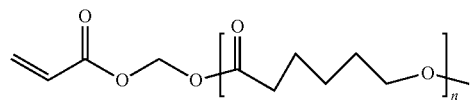

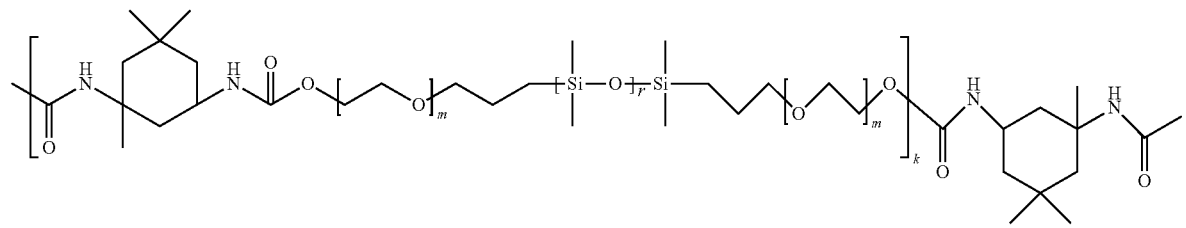

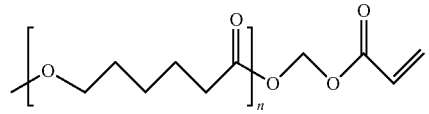

[Formula 7a]

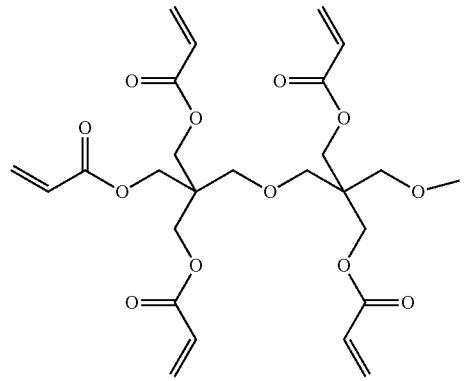

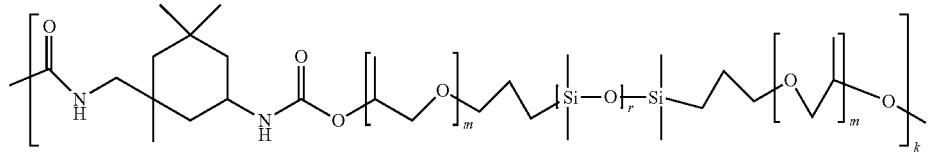

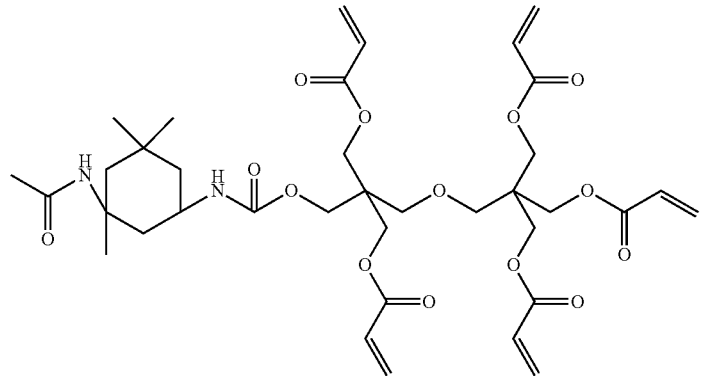

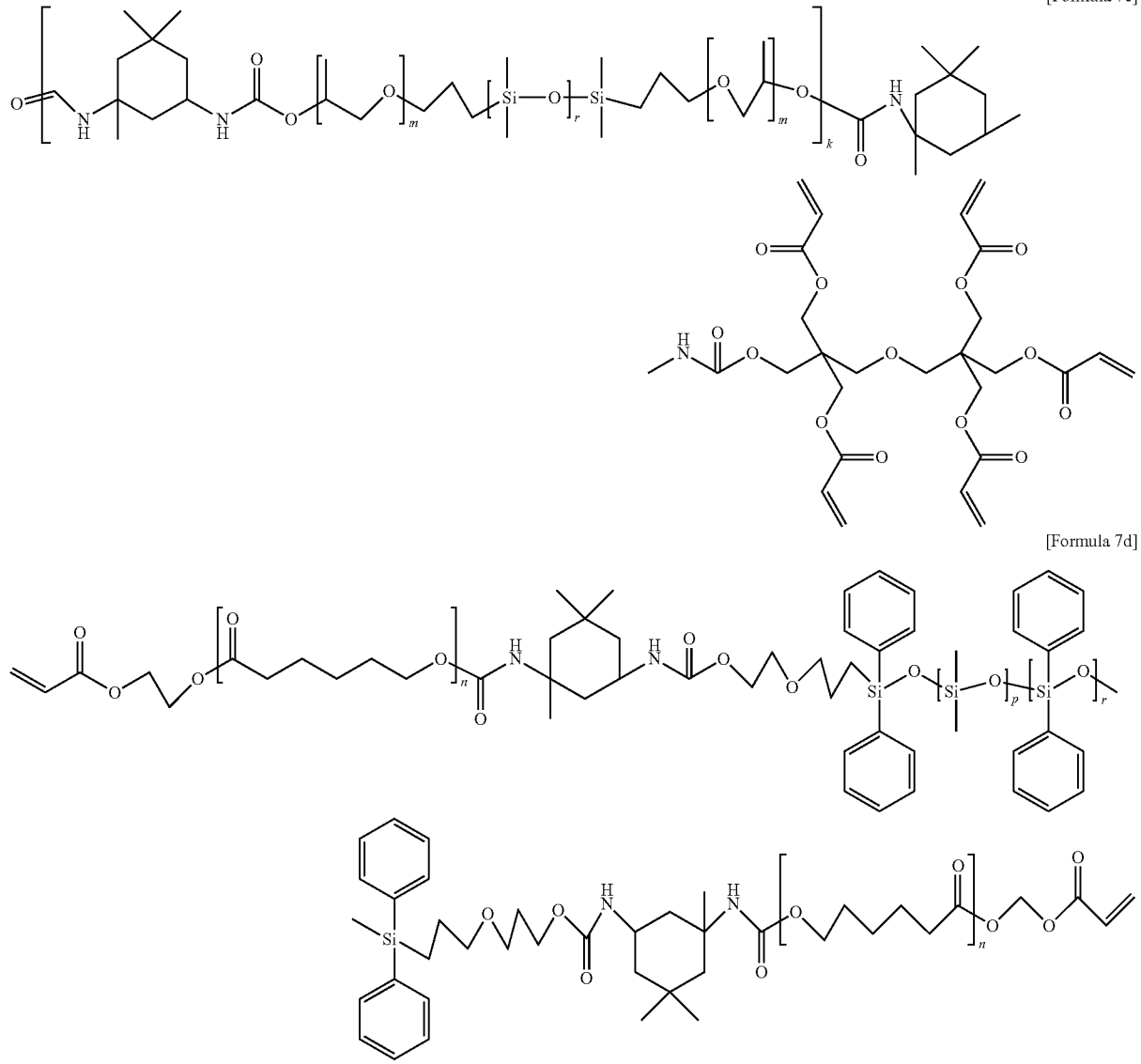

where k is an integer of 1 to 200,
n is an integer of 1 to 30,
m is an integer of 1 to 30,
P is an integer of 1 to 400,
r is an integer of 1 to 400, and
a molar ratio of p:r is in a range of 0:100 to 80:20.

20. The composition for a gel polymer electrolyte of claim 13, wherein the polymer network further contains inorganic particles in the polymer network.

21. A lithium secondary battery comprising:
a positive electrode and a negative electrode capable of intercalating and deintercalating lithium; and
a polymer electrolyte disposed between the positive electrode and the negative electrode,
wherein the polymer electrolyte comprises the gel polymer electrolyte of claim 1.

* * * * *